(12) United States Patent
Backhaus-Ricoult et al.

(10) Patent No.: US 11,878,947 B2
(45) Date of Patent: Jan. 23, 2024

(54) SHEAR BINDER AGGLOMERATES ENABLING HIGH POROSITY IN CERAMIC HONEYCOMB BODIES

(71) Applicant: CORNING INCORPORATED, Corning, NY (US)

(72) Inventors: Monika Backhaus-Ricoult, Bourron (FR); Linda Kay Bohart, Liberty, PA (US); Kimberley Louise Work, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 207 days.

(21) Appl. No.: 17/103,322

(22) Filed: Nov. 24, 2020

(65) Prior Publication Data

US 2021/0155555 A1 May 27, 2021

Related U.S. Application Data

(60) Provisional application No. 62/940,844, filed on Nov. 26, 2019.

(51) Int. Cl.
*C04B 38/08* (2006.01)
*C04B 38/00* (2006.01)
(Continued)

(52) U.S. Cl.
CPC .......... *C04B 38/085* (2013.01); *C04B 35/195* (2013.01); *C04B 35/6303* (2013.01);
(Continued)

(58) Field of Classification Search
CPC .............. C04B 35/195; C04B 35/6303; C04B 35/6316; C04B 35/6365; C04B 2235/3481; C04B 2235/3206; C04B 2235/3217; C04B 2235/3218; C04B 2235/3225; C04B 2235/3232; C04B 2235/3418; C04B 2235/2235; C04B 2235/5436; C04B 2235/5276; C04B 2235/5472;
(Continued)

(56) References Cited

U.S. PATENT DOCUMENTS 5,458,834 A 10/1995 Faber et al.
5,602,197 A 2/1997 Johnson et al.
(Continued)

FOREIGN PATENT DOCUMENTS

EP 1803494 A2 * 7/2007 ......... B01D 39/2086
EP 3202745 A1 8/2017
WO 2019/089735 A1 5/2019

*Primary Examiner* — Tri V Nguyen
(74) *Attorney, Agent, or Firm* — Daniel J. Greenhalgh

(57) ABSTRACT

A ceramic precursor mixtures for extrusion and firing into porous ceramics. The ceramic precursor mixtures include ceramic beads and green inorganic shear binder agglomerates. The green inorganic shear binder agglomerates can include inorganic filler particles and a polymeric binder. The green inorganic shear binder agglomerates can deform under an applied shear stress during mixing and/or extrusion such that they are smeared into a plurality of interbead gaps between adjacent ceramic beads or pore former particles. During firing, the smeared green inorganic shear binder agglomerates can sinter and react to form ribbons extending between, and interconnecting adjacent ceramic beads.

11 Claims, 19 Drawing Sheets

(51) Int. Cl.
*C04B 35/195* (2006.01)
*C04B 35/63* (2006.01)

(52) U.S. Cl.
CPC .. *C04B 38/0006* (2013.01); *C04B 2235/3481* (2013.01); *C04B 2235/5436* (2013.01); *C04B 2235/606* (2013.01); *C04B 2235/6021* (2013.01); *C04B 2235/786* (2013.01)

(58) Field of Classification Search
CPC .......... C04B 2235/5292; C04B 38/085; C04B 38/0006; C04B 38/0074; C04B 38/06
USPC ........................................................ 428/178
See application file for complete search history.

(56) References Cited

U.S. PATENT DOCUMENTS

| | | |
|---|---|---|
| 6,113,829 A | 9/2000 | Bookbinder et al. |
| 6,368,992 B1 | 4/2002 | Beall et al. |
| 8,440,586 B2 | 5/2013 | Lu et al. |
| 9,376,347 B2 | 6/2016 | Backhaus-Ricoult et al. |
| 9,623,360 B2 | 4/2017 | Backhaus-Ricoult et al. |
| 9,908,260 B2 | 3/2018 | Backhaus-Ricoult et al. |
| 2004/0097362 A1 | 5/2004 | Addiego |
| 2005/0266992 A1* | 12/2005 | Ohno ................. C04B 35/6316 502/439 |

\* cited by examiner

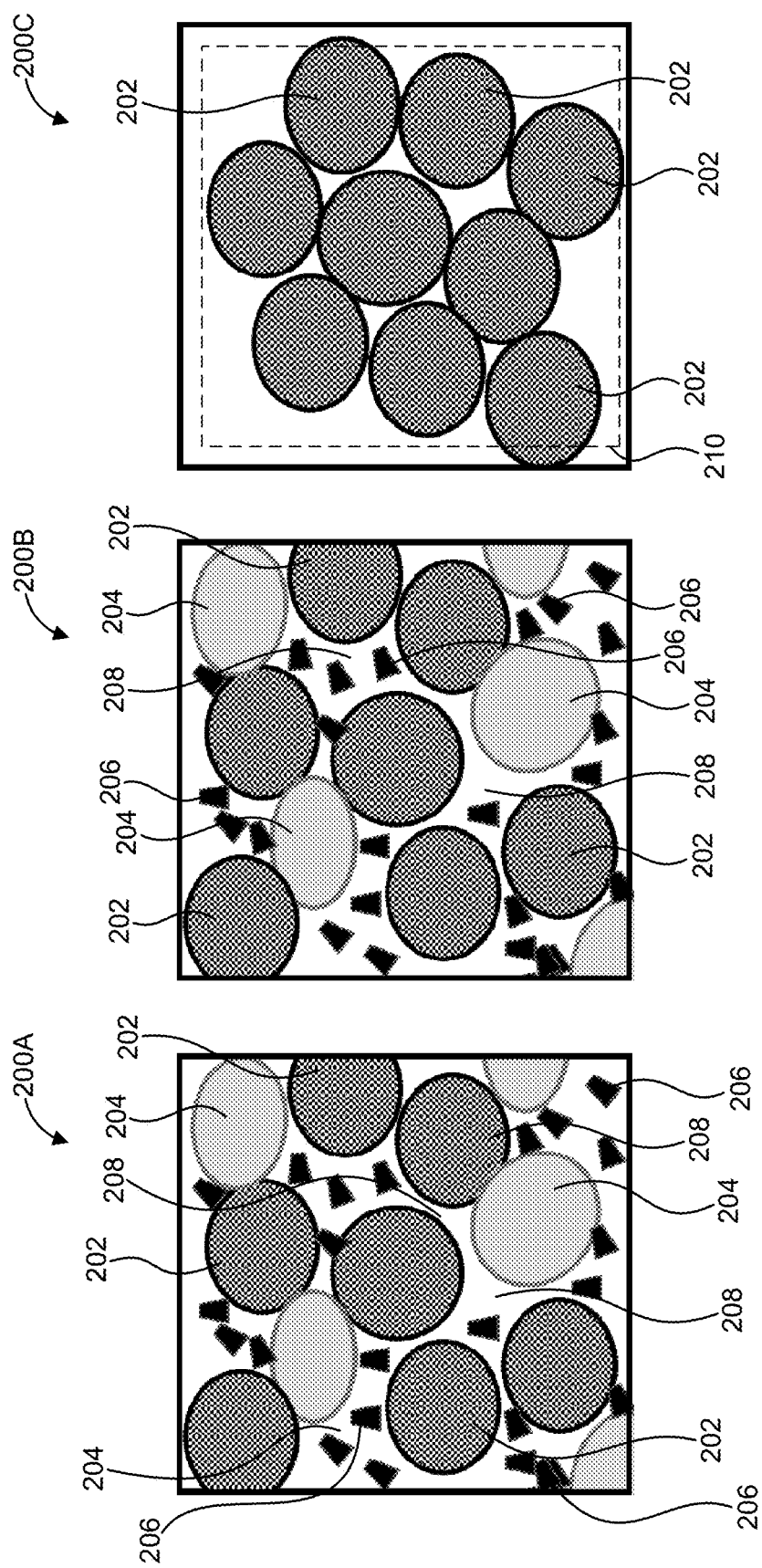

SHEAR BINDER AGGLOMERATES ENABLING HIGH POROSITY IN CERAMIC HONEYCOMB BODIES

CROSS REFERENCE TO RELATED APPLICATIONS

This application claims the benefit of priority under 35 U.S.C. § 119 of U.S. Provisional Application Ser. No. 62/940,844 filed on Nov. 26, 2019, the content of which is relied upon and incorporated herein by reference in its entirety.

FIELD

The present disclosure relates to extrusion and firing of porous ceramics. In particular, the present disclosure relates to ceramic precursor mixtures including green shear binder agglomerates for extrusion and firing into porous ceramics.

BACKGROUND

Honeycomb articles, for example those used as catalytic converters and particulate filters in exhaust systems of internal combustion engines, may comprise porous ceramic materials.

BRIEF SUMMARY

The present disclosure is directed to green shear binder agglomerates for ceramic batch mixtures that improve the strength and increase the porosity of final fired articles. Compositions and methods disclosed herein are designed to produce a porous ceramic body, for example a porous ceramic honeycomb body, having high porosity and that maintains its structural integrity during and after firing. In some embodiments, the structural integrity of an extruded green ceramic body is maintained after firing due to the addition of green shear binder agglomerates, which are sheared (e.g., smeared or otherwise deformed) into gaps between ceramic beads and/or pore former particles during mixing and/or extrusion. The deformed green shear binder agglomerates attach to, and connect together adjacent ceramic beads, such that bridges, or ribbons, are created between these beads. During firing, the inorganic components of the deformed agglomerates (e.g., bridges or ribbons) react together and/or sinter together and with the ceramic beads to provide structural support to the fired honeycomb article. Without such shear binders, adjacent beads would need to be closely packed during sintering, e.g., sintered at point-to-point contact between the beads. By shearing into bridges or ribbons, adjacent ceramic beads can be connected together by the deformed agglomerates even if the beads are spaced apart, thus enabling the degree of packing between the beads to be reduced, which correspondingly enables porosity of the fired honeycomb body to be increased.

Some embodiments are directed to a ceramic precursor mixture, comprising: ceramic beads having a ceramic phase and a median bead size of at least 20 µm; and and green shear binder agglomerates having a median agglomerate size that is from 20% to 120% of the median bead size, each green shear binder agglomerate comprising inorganic filler particles in a polymeric binder matrix.

In some embodiments, the ceramic phase of the ceramic beads comprises cordierite.

In some embodiments, a bead size distribution of the ceramic beads comprises a breadth ((d90−d10)/d50) of less than 1.2.

In some embodiments, the breadth of the bead size distribution is less than 0.75.

In some embodiments, the median agglomerate size is at most 50% of the median bead size.

In some embodiments, the ceramic beads comprise a median bead size in a range of 20 µm to 65 µm.

In some embodiments, the inorganic filler particles comprise at least one of: a mixture of cordierite-precursor powders, a mixture of precursor powders for cordierite-mullite-aluminum titanate composite, a mixture of precursor powders for an aluminum titanate composite, alumina particles, talc particles, or silica particles.

In some embodiments, the inorganic filler particles comprise at least one of a platy shape or a rod shape.

In some embodiments, the inorganic filler particles comprise an aspect ratio of at least 2:1.

In some embodiments, the green shear binder agglomerates are spray-dried agglomerates.

In some embodiments, a fraction of the ceramic beads in the ceramic precursor mixture is in a range of 80 wt. % to 97 wt. %.

In some embodiments, a fraction of the green shear binder agglomerates in the ceramic precursor mixture is in a range of 3 wt. % to 25 wt. %.

In some embodiments, a fraction of the inorganic filler particles in the green shear binder agglomerates is in a range of 90 wt. % to 99 wt. %.

In some embodiments, the mixture further comprises pore former particles.

Some embodiments are directed to a method for manufacturing an extruded ceramic body, the method comprising: mixing a plurality of inorganic filler particles and a polymeric binder, thereby forming a shear binder mixture; forming a plurality of green shear binder agglomerates from the shear binder mixture; mixing together a plurality of ceramic beads and the plurality of green shear binder agglomerates, thereby forming an extrusion paste; extruding the extrusion paste to form a green body; drying the green body; and firing the green body to form a fired ceramic body comprising a network of the ceramic beads interconnected by ribbons formed from the inorganic filler particles of the green shear binder agglomerates.

In some embodiments, the green body comprises a honeycomb geometry.

In some embodiments, forming the plurality of green shear binder agglomerates comprises spraydrying the shear binder mixture.

In some embodiments, the green shear binder agglomerates are deformed under an applied shear stress and smeared to span interbead gaps between adjacent ceramic beads, wherein the applied shear stress occurs during at least one of the mixing or the extruding.

In some embodiments, during firing of the green body, the smeared green shear binder agglomerates sinter and react to form ribbons extending between, and connecting together, adjacent ceramic beads.

In some embodiments, the polymeric binder of the green shear agglomerates burns out or evaporates during firing of the green body, such that the ribbons consist essentially of inorganic filler particles that have been sintered, reacted, or a combination of both.

In some embodiments, the ribbons bridge across interbead gaps to interconnect ceramic beads that are not in direct contact with each other.

In some embodiments, the green body and the fired ceramic body each comprise a honeycomb cell geometry with an average wall thickness differing by not more than 5%.

Some embodiments are directed to a porous honeycomb body, comprising: a matrix of cells, the matrix of cells comprising a porous ceramic material comprising: a plurality of ceramic beads; and a plurality of inorganic ribbons spanning interbead gaps between adjacent ceramic beads, and connecting adjacent ceramic beads together.

In some embodiments, less than 10% of the ceramic beads are in direct contact with adjacent ceramic beads.

In some embodiments, at least 90% of the ceramic beads are connected to at least one of the ribbons.

In some embodiments, the porous honeycomb body has a porosity of greater than 60%.

In some embodiments, the ceramic beads comprise a median bead size in a range of 20 μm to 65 μm.

In some embodiments, the ribbons comprise a thickness in a range of 3% to 10% of a median bead size of the ceramic beads.

In some embodiments, the ribbons comprise a length in a range of 30% to 100% of a median bead size of the ceramic beads.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 2A is a schematic drawing of a ceramic precursor mixture including a fine powder used as a binder.

FIG. 2B is a schematic drawing of the ceramic precursor mixture of FIG. 2A after a shear force has been applied.

FIG. 2C is a schematic drawing of the resulting microstructure formed by firing the ceramic precursor mixture of FIG. 2A.

DETAILED DESCRIPTION

Figure 1C:
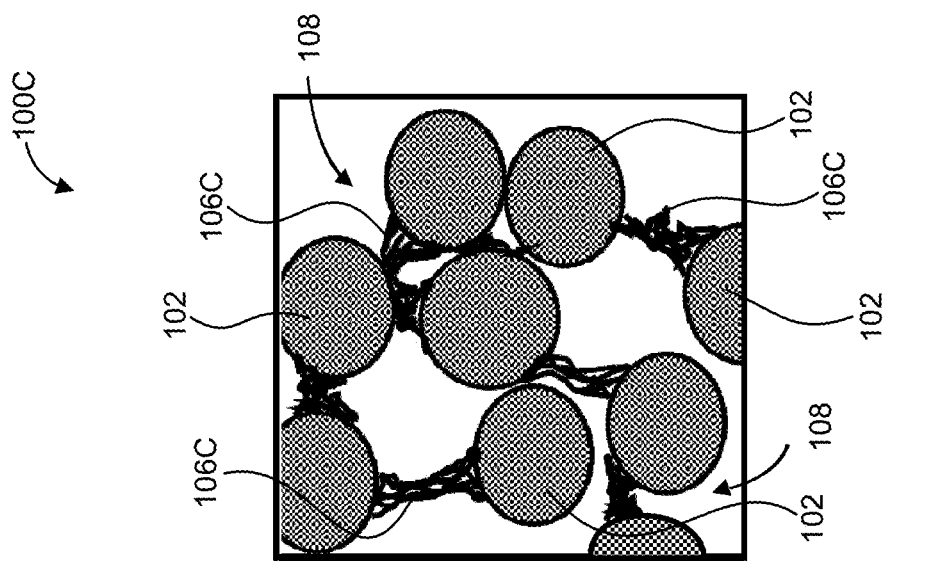
FIG. 1C is a schematic drawing of the resulting microstructure formed by firing the ceramic precursor mixture of FIG. 1B.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Honeycomb articles, for example those used as catalytic converters and particulate filters in exhaust systems of internal combustion engines, may be made from porous ceramic materials. In some particulate filters, it may beneficial for the ceramic to have high porosity to improve the permeability of the filter walls by increasing interconnectivity between pores. And, in some catalyzed filters and converters, it may be beneficial for the ceramic to have high in-wall porosity to increase the surface area on which catalysts for abatement of NOx, hydrocarbon, CO and others can be fixed.

The manufacture of very high porosity honeycomb articles presents challenges because reactive and pre-reacted inorganic particles in the green extruded ware may react and/or sinter during firing and, especially in the presence of intermediate glassy or liquid phases, may lose a portion of the porosity of their initial particle packing. To help improve porosity, pore formers such as starch, graphite, polymer beads, cellulose, or other combustible materials can be added to an extrusion batch. These combustible materials burn out during firing of an extruded green body, e.g., at temperatures between 200° C.-300° C. (polymers), between 300° C.-450° C. (starches), or between 400° C.-600° C. (graphite), leaving behind pores in the remaining inorganic material.

Due to the difference between the temperature at which the pore formers are burned out and the inorganic materials sinter and/or react, the pores left by the pore formers often shrink during the high temperature firing process that causes the high-temperature solid state reactions and/or sintering of the inorganic materials. Accordingly, the final pore sizes in sintered honeycomb bodies may be much smaller than the pores initially created immediately when the pore former is burned off. Additionally, excessive sintering of honeycomb bodies having high amounts of pore former might produce shrinkage in the wall thickness and/or diameter of the final honeycomb article.

In some instances, the ceramic phases of a ceramic honeycomb body may be formed in-situ by reaction of ceramic precursors during firing of a honeycomb green body (e.g., components such as clay, talc, etc. may react during firing of the honeycomb body to form cordierite or other ceramic phases). In contrast, of use herein are batch materials that include ceramic particles that before firing of the honeycomb body already comprise one or more of the ceramic phases (e.g., cordierite) that will be present in the final honeycomb body. Since these particles already comprise one or more ceramic phases before firing of the final honeycomb body, they may be referred to herein as having already been reacted, or alternatively, as being "pre-reacted" particles or batch materials. For example, such pre-reacted batch materials may comprise ceramic beads that were subjected to a firing or calcining process prior to being used as extrusion batch material to form a ceramic precursor mixture with other components useful for forming the final ceramic honeycomb body as a result of firing. Consequently, these pre-reacted beads may not undergo any significant reactions during further processing. Therefore, the bead shapes and sizes may not change during firing of the honeycomb body. In some instances, the use of pre-reacted particles of spheroidal shape can provide particular advantages for the particle packing in a green extrudate, promoting a bead-built structure with higher porosity and wider pore channels than produced by an extrusion paste of reactive (e.g., unreacted precursors) materials. Accordingly, smaller amounts of pore former can be added to batches comprising pre-reacted beads than with reactive batches, to achieve much higher porosities. Effectively, for small amounts of pore former a beneficial effect on porosity is observed. However, as increasing amounts of pore former is used, burn-out of the pore former may reduce the strength of the resulting honeycomb article, or even cause the extruded honeycomb to crack, fragment, and/or crumble into powder during firing. For example, this can be due to decreased sintered contact between the pre-reacted beads caused by the presence of an increased volume of pores.

The pre-reacted ceramic bead is obtained by reaction (and/or sintering) of particles of a green inorganic agglomerate in a firing (e.g., calcining) process. Thus, the reaction of the pre-reacted particles is conducted before the pre-reacted beads are mixed with other components to form a batch, ceramic-precursor mixture, and/or extrusion paste (these terms used interchangeably) for forming a green honeycomb article, as described herein.

For example, pre-reacted beads can be made by mixing one or more inorganic powders with a polymer followed by breaking up of the polymer, such as by grinding, and firing the ground particles/polymer-beads to form pre-reacted beads. As another example, a slurry including a plurality of inorganic powders, pore former additives, and polymeric binders can be formed and compacted to form green agglomerates, such as by drying. The dried agglomerates are then fired (calcined) to form pre-reacted beads. Other methods include spray-drying, spin drying, and atomizing a slurry to form green agglomerates including inorganic particles that can then be fired to form pre-reacted beads. Pre-reacted beads can have a multiphase composition. For example, pre-reacted beads can have a multiphase composition including two or more of: silica, alumina, titania, cristobalite, mullite, rutile, $SrTi_3Al_8O_{19}$, feldspar, aluminum titanate, aluminum titanate solid solution pseudobrookite, glass, and cordierite.

According to embodiments described herein, to improve the intermediate firing strength of a ceramic body, for example a honeycomb body, green shear binders are added to a ceramic precursor mixture (also called an "extrusion batch composition"). As used herein, a "shear binder agglomerate" is an agglomerate of fine inorganic particles (inorganic filler) embedded in a polymeric binder matrix, which may deform or shear under shear stress. The deformability of the shear binder agglomerates depends on the viscosity of the polymeric material and the solid loading (SL) of the inorganic particles in the agglomerate. The shear deformation of the shear binders is beneficial during the stages of shear mixing of extrusion pastes (e.g., in an extruder prior to extrusion) and extruding the paste through die slots, particularly when such shear binder agglomerates are used with ceramic beads as described herein. During these stages, the deformable shear binder particles deform under shear, e.g., when crushed or compressed between two or more ceramic beads during mixing, In particular, when mixed with ceramic beads, such deformation enables the material of the shear binder agglomerates to form bridges that span the interbead gaps between adjacent ceramic beads. After firing, the material of the bridges react and/or sinter to connect together the adjacent ceramic beads. The green shear binders can include inorganic particles having a composition similar to the composition of the ceramic beads in the batch, and at least one polymeric binder. Accordingly, after firing, the shear binders can have a composition similar to one or more final phases of the fired batch composition. In some embodiments, the green shear binder mixture is spray dried into spheroidal agglomerates.

In their green, "ceramic-forming" state, the green shear binder agglomerates are a collection of filler particles held together by a polymeric binder. The polymeric binder is a temporary component of the agglomerates that is removed, e.g., burns away, during firing of a green body made of the ceramic precursor mixture. During a firing step, the inorganic filler particles react and/or sinter to form a desired ceramic composition. In some embodiments, the desired ceramic composition is the composition of the filler particles, for example in embodiments where only one type of filler particle is used. In some embodiments, the desired ceramic composition is a ceramic composition formed by reacting different types of filler particles together. For example, in one embodiment the inorganic filler particles comprise a combination of talc, clay, alumina, and/or silica such that the agglomerates form cordierite. The desired ceramic composition can be similar to the composition of the ceramic beads used in a ceramic precursor mixture.

The polymer in the green shear binder agglomerates enables deformation of the agglomerates under stress. During formation of the green batches, high shear stresses occur during both batch mixing and extrusion through the die slots. The green shear binder agglomerates in the extrusion paste undergo shear deformation and are smeared into the interstices between the other batch particles, namely, pre-reacted ceramic beads as described herein. In some embodiments, the green shear binder agglomerates are strong enough to maintain shape during handling under low stresses, but are also able to deform/smear under the large shear forces applied during mixing and/or extrusion.

The shearability of a green shear binder agglomerate can be defined by its deformation rate under stress. More simply, the shearability is influenced by the viscosity of the polymer and the solid inorganic particle loading. The shearability can be measured by standard viscosity or creep measurements of the particle-loaded polymer mixtures. As described with respect to the shear binder agglomerates herein, suitable viscosity enables the inorganic particles of the shear binder agglomerate, still suspended in the polymer matrix, to be smeared into continuous bridges or ribbons across gaps between larger batch particles (e.g., the ceramic beads and/or pore form particles, as described herein), during formation of a green body. For example, if by experimental observation the shear binder agglomerates is too stiff or hard (e.g., having insufficient viscosity), the agglomerates may not be smeared across the interparticle gaps (e.g., the inter-bead gaps as described herein). If the solids-loaded polymer material of the shear binder agglomerates is too soft, handling may be challenging and the bridges or ribbons may not have sufficient consistency to maintain shape before the inorganic particles are sintered and/or reacted during firing of the final honeycomb article. Example solids loadings and polymeric materials are disclosed herein, however, different solids loading and polymeric materials in accordance with the disclosure herein can be utilized depending on the other raw materials utilized.

After the pore former is removed, e.g., burns out, the ribbons of the smeared agglomerates assist in providing additional intermediate firing strength, preventing collapse of the bead-built structure during firing, and suppressing wall shrinkage and loss of cell geometry. This preserves the high porosity provided by the pore formers and facilitates creation of high porosity ceramic bodies with desired geometries. During the honeycomb firing, any reactive ceramic precursors in the shear agglomerate react to form the corresponding ceramic phase, while ceramic material (either newly formed or provided in the inorganic filler particles of the shear binder agglomerates) may undergo sintering, e.g., to connect or attach to the ceramic beads. To improve packing stability of the inorganic mixture of the shear binder agglomerates, e.g., such as after the agglomerates are sheared into ribbons or bridges, platy or rod-shaped particles can be used, early reactions can be promoted (for example by adding sintering aids, such as alkali oxides), and/or a silicon source such as colloidal silica can be added.

Figure 1B:
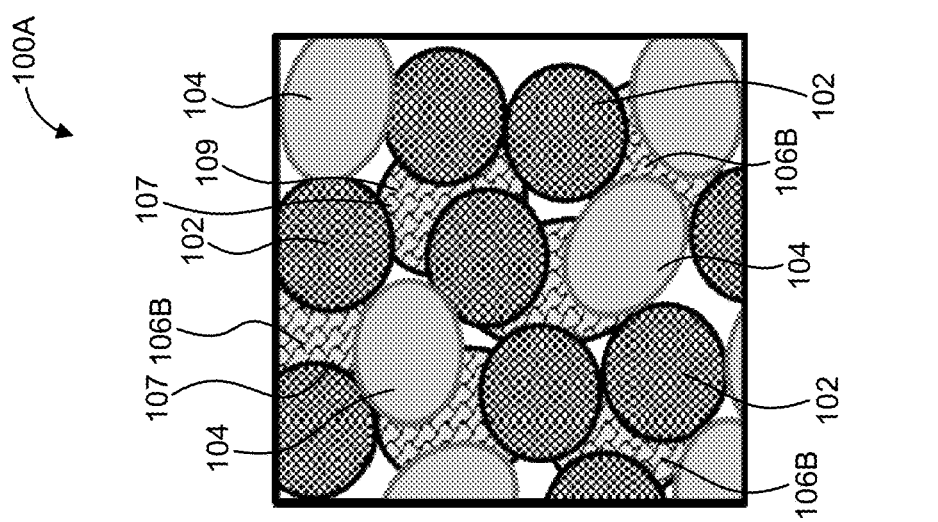
FIG. 1B is a schematic drawing of the ceramic precursor mixture of FIG. 1A after a shear force has been applied.
Figure 1A:
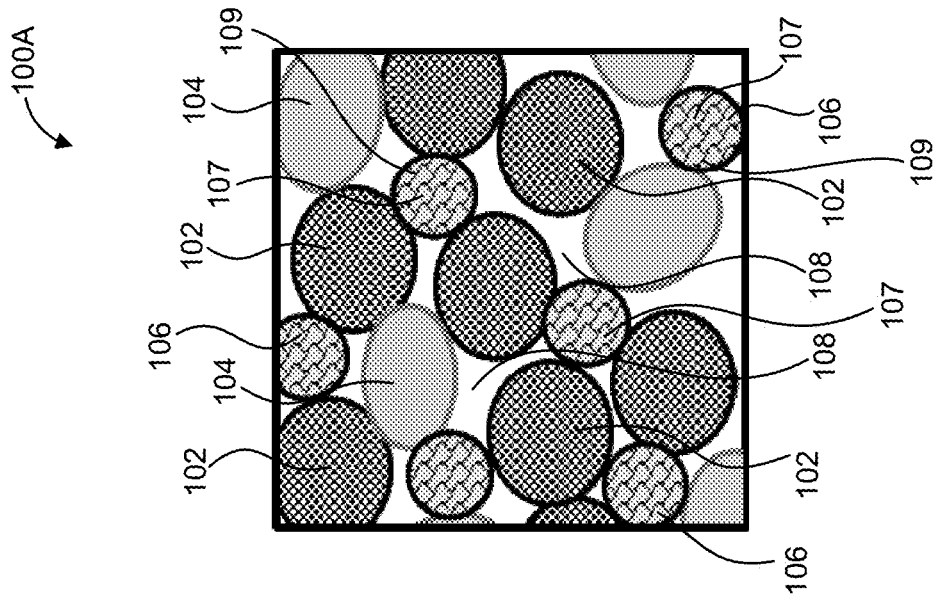
FIG. 1A is a schematic drawing of a ceramic precursor mixture according to some embodiments.

As shown in FIG. 1A, in some embodiments, a ceramic precursor mixture 100A includes ceramic beads 102, pore former particles 104, and green shear binder agglomerates 106. As described herein, a ceramic "bead" refers to a spheroidal (e.g., having a generally spherical, ellipsoidal, oblate spheroidal, prolate spheroidal, or teardrop shape)) ceramic particle composed of multiple grains of at least one ceramic phase. Beads can be dense (having little to no porosity), porous, or hollow. Pores within porous beads can be closed, open, and/or have channels extending between pores.

Ceramic beads 102 can be composed of one or more crystallographic phases, each with different chemical compositions. In this way, and in accordance with the disclosure above, the ceramic beads 102 may be referred to herein as pre-reacted ceramic beads or as simply pre-reacted beads. In some embodiments, the ceramic beads 102 are fully reacted such that additional calcining will not produce further percentages of the selected ceramic phase, while in other embodiments, the ceramic beads 102 are at least partially reacted, such that the selected ceramic phase exists, but at a percentage that is less than a maximum percentage of such ceramic phase that is attainable if the ceramic beads 102 undergo further calcination. In some embodiments, ceramic beads 102 comprise a cordierite phase, e.g., comprise cordierite beads. Cordierite beads can contain cordierite and/or indialite as main phases, and optionally, glass as a minor phase, and some impurity phases (<5%). In some embodiments, ceramic beads 102 include cordierite-mullite-aluminum magnesium titanate (CMAT) beads. For example, a CMAT bead can have a major phase (>50%) of aluminum titanate, with minor phases of at least cordierite and mullite. In some embodiments, the CMAT beads comprise 50 wt. % to 60 wt. % aluminum magnesium titanate, 35 wt. % to 45 wt. % cordierite. Glass can form a minor phase. In some embodiments, the CMAT beads are composed of at least 55 wt. % aluminum magnesium titanate and at least 40 wt. % cordierite, and glass.

Ceramic beads 102 in the precursor mixture can have a median particle size, referred to as a median bead size, in the range of 15 micrometers to 75 micrometers. For example, the median bead size of ceramic beads 102 can be at least 15 μm, at least 18 μm, at least 20 μm, at least 25 μm, at least 30 μm, at least 35 μm, at least 40 μm, at least 45 μm, at least 48 μm, at least 50 μm, from 18 μm to 25 μm, 20 μm to 30 μm, 20 μm to 35 μm, 20 μm to 40 μm, 20 μm to 45 μm, 20 μm to 50 μm, 20 μm to 50 μm, 20 μm to 55 μm, 20 μm to 60 μm, 20 μm to 65 μm, 60 μm to 65 μm, 55 μm to 65 μm, 50 μm to 65 μm, 45 μm to 65 μm, 40 μm to 65 μm, 35 μm to 65 μm, 30 μm to 65 μm, 25 μm to 65 μm, 15 μm to 30 μm, 15 μm to 35 μm, 15 μm to 40 μm, 15 μm to 45 μm, 15 μm to 50 μm, 15 μm to 55 μm, 15 μm to 60 μm, 15 μm to 65 μm, 18 μm to 30 μm, 18 μm to 35 μm, 18 μm to 40 μm, 18 μm to 45 μm, 18 μm to 50 μm, 18 μm to 55 μm, 18 μm to 60 μm, 18 μm to 65 μm, or within a range having any two endpoints of these ranges as endpoints. The particle size distribution of ceramic beads in a pre-reacted powder can be determined with particle size analyzers, based on different technologies, such as laser diffraction, dynamic light scattering, high definition optical 3D microscopy or flow camera image processing, analysis of Brownian motion, gravitational settling, or sieving.

The particle size distribution of ceramic beads 102 for ceramic precursor mixture 100A can be selected depending on desired properties of the final fired ceramic article. For example, a relatively wider bead size distribution may be beneficial to stabilize an extruded particle packing during firing and after pore former burn out; however, a relatively narrower bead size distribution may provide more desirable gas permeability in the final fired extruded honeycomb bodies. According to embodiments described herein, the breadth of the bead size distribution is determined using the following formula:

$$\frac{d90 - d10}{d50}$$

where d90 is the average bead size of the ceramic beads in the $90^{th}$ percentile, d10 is the average bead size of the ceramic beads in the $10^{th}$ percentile, and d50 is the median bead size of all of the ceramic beads in the mixture.

In some embodiments, the breadth of the bead size distribution of the ceramic beads 102 is in a range of 0.2 to 1.5. For example, in some embodiments, ceramic beads 102 may have a bead size distribution breadth of 0.2 to 0.3, 0.2 to 0.4, 0.2 to 0.5, 0.2 to 0.6, 0.2 to 0.7, 0.2 to 0.8, 0.2 to 0.9, 0.2 to 1, 0.2 to 1.1, 0.2 to 1.2, 0.2 to 1.3, 0.2 to 1.4, or 0.2 to 1.5, or within range having any two of these values as end points. In some embodiments, ceramic beads 102 have a bead size distribution of less than 1.2. In some embodiments, ceramic beads 102 have a bead size distribution of less than 1. In some embodiments, ceramic beads have a bead size distribution of less than 0.75.

In ceramic precursor mixtures comprising cordierite beads 102, the breadth of the bead size distribution of the cordierite beads 102 can be, for example, less than 0.7, less than 0.75, less than 0.8, less than 0.85, less than 0.9, less than 0.95, or less than 1. In ceramic precursor mixtures comprising CMAT beads 102, the breadth of bead size distribution can be less than 0.9, less than 0.95, less than 1.0, less than 1.05, less than 1.1, less than 1.15, or less than 2.

Table 1, below, shows the inorganic components for mixtures B1-B2 that can be used for the pre-reacted ceramic beads 102. In not only Table 1, but consistently throughout this disclosure, any weight percents of inorganic components of a mixture are given with respect to the total weight of all inorganics. For the purposes herein, the entirety of the shear binder agglomerates are considered as inorganic components.

TABLE 1

| Ceramic Bead Mixture Number | Kaolin Clay Wt. % | Hydrous Clay Wt. % | $Mg(OH)_2$ Wt. % | Silica Soot Wt. % | Alumina Wt. % | Hydrated Alumina Wt. % | Talc Wt. % | Sodium Stearate Wt. % |
|---|---|---|---|---|---|---|---|---|
| BM1 | | 11.58 | | 14.25 | 14.55 | 18.42 | 40.2 | 1 |
| BM2 | 76.9 | | 11.1 | | | | 16.2 | |

Pore former particles, for example pore former particles 104 can be added to ceramic precursor mixture 100A to create pores in a final fired ceramic body, for example a final fired honeycomb article. As discussed above, some pore formers burn out of a ceramic precursor mixture or are otherwise removed during firing of the extruded ceramic body, leaving pores in the ceramic. Pore former particles 104 can be composed of combustibles, for example, various starches, graphite, polymer beads, or cellulose. In some embodiments, pore former particles 104 comprise at least one of starch, graphite, and/or polymer spheres. The starch can comprise pea starch, potato starch, rice starch, wheat starch, sago starch, corn starch, or another natural or synthetic starch.

In some embodiments, the median particle size of pore former particles 104 is equal to the median bead size of the ceramic beads 102, +/−25%. That is, in some embodiments, the median particle size of the pore former particles 104 is from 75% to 125% of the median bead size of the ceramic beads 102. By adding pore former particles having median bead sizes similar to that of the ceramic beads, pores having a size similar to that of the beads 102 can be created, and a more uniform pore distribution achieved.

In some embodiments, the wt. % of pore former particles 104 in ceramic precursor mixture 100A is in a range of 20 wt. % to 40 wt. % as a super addition with respect to the inorganics in the precursor mixture 100A, including subranges. For example, the super addition wt. % of pore former particles 104 can be 20 wt. %, 25 wt. %, 30 wt. %, 35 wt. %, or 40 wt. %, or within a range having any two of these values as endpoints, inclusive of the endpoints. In some embodiments, ceramic precursor mixture 100A comprises no more than 20 wt. % super addition of pore former particles 104. In some embodiments, ceramic precursor mixture 100A comprises no more than 40 wt. % super addition of pore former particles 104.

Green shear binder agglomerates 106 comprise inorganic filler particles 107 and a matrix of one or more polymeric binders 109 (interchangeably matrix 109, polymeric binder 109, and polymeric binder matrix 109) for the inorganic filler particles 107. In some embodiments, green shear binder agglomerates 106 consists essentially of inorganic filler particles 107 and polymeric binder 109. In some embodiments, green shear binder agglomerates 106 consists of inorganic filler particles 107 and polymeric binder 109. In some embodiments, shear binder agglomerates 106 have a median particle size, referred to herein as a median agglomerate size, in the range of 10 μm to 50 μm, including subranges. For example, shear binder agglomerates 106 can have a median agglomerate size of 15 μm to 20 μm, 15 μm to 25 μm, 15 μm to 30 μm, 15 μm to 35 μm, 15 μm to 40 μm, 35 μm to 40 μm, 30 μm to 40 μm, 25 μm to 40 μm, or 20 μm to 40, 18 μm to 20 μm, 18 μm to 25 μm, 18 μm to 30 μm, 18 μm to 35 μm, 18 μm to 40 μm, 18 μm to 50 μm, or within a range having any two endpoints of these ranges as endpoints, inclusive of the endpoints. In some embodiments, shear binder agglomerates 106 have a median agglomerate size in the range of 15 μm to 25 μm.

In some embodiments, the shear binder agglomerates 106 have a median agglomerate size that is a percentage of the median bead size of the ceramic beads 102. In some embodiments the median agglomerate size is between 20% and 120% of the median bead size of the beads 102. In some embodiments, the median agglomerate size is at most 100%, at most 80%, at most 70%, at most 60%, or at most 50% of the median bead size. In some embodiments, the median agglomerate size is between 20% and 65%, 30% and 65%, or 40% and 65% of the median bead size.

In some embodiments, the fraction of pre-reacted ceramic beads 102 in ceramic precursor mixture 100A is in a range of 80 wt. % to 97 wt. %, including subranges. The fraction of ceramic beads may be at least 80 wt %, at least 85 wt %, at least 90 wt %, at least 92 wt %, at least 94 wt %, at least 95 wt % or even at least 97 wt %. In some embodiments, the fraction of ceramic beads 102 in ceramic precursor mixture 100A is from 80 wt. % to 85 wt. %, 80 wt. % to 90 wt. %, 80 wt. % to 92 wt. %, 80 wt. % to 95 wt. %, 85 wt. % to 90 wt. %, 85 wt. % to 95 wt. %, 85 wt. % to 97 wt. %, 90 wt. % to 95 wt. %, 90 wt. % to 95 wt. %, 92 wt. % to 97 wt. %, 94 wt. % to 97 wt. %, or 95 wt. % to 97 wt. %.

In some embodiments, the fraction of shear binder agglomerates 106 in ceramic precursor mixture 100A is in a range of 3 wt. % to 25 wt. %, including subranges. For example, the fraction of shear binder agglomerates 106 may be 3 wt. %, 5 wt. %, 10 wt. %, 15 wt. %, 20 wt. %, or 25 wt. %, or within a range having any two of these values as endpoints, inclusive of the endpoints. In some embodiments, the fraction of shear binder agglomerates 106 in ceramic precursor mixture 100A is from 3 wt. % to 5 wt. %, 3 wt. % to 10 wt. %, 3 wt. % to 15 wt. %, 3 wt. % to 20 wt. %, 20 wt. % to 25 wt. %, 15 wt. % to 25 wt. %, 10 wt. % to 25 wt. %, 5 wt. % to 10 wt. %, 5 wt. % to 15 wt. %, 5 wt. % to 20 wt. %, 10 wt. % to 15 wt. %, 10 wt. %, to 20 wt. %, or 15 wt. % to 20 wt. %.

In some embodiments, filler particles 107 have a composition similar to the composition of the ceramic beads 102 and/or comprise a precursor mixture that will result in a composition similar to that of the ceramic beads 102 after firing. For example, filler particles 107 can be composed of a mixture of cordierite or cordierite precursor powders, CMAT or a mixture of CMAT precursor powders, or a mixture of precursor powders for an aluminum titanate composites. In some embodiments, filler particles 107 additionally or alternatively comprise one or more of sapphirine, mullite, spinel, enstatite, clay, alumina, talc, and silica particles or their precursors.

In some embodiments, inorganic filler particles 107 of shear binder agglomerates 106 have an anisotropic and/or high aspect ratio shape, for example a platy shape, a fibrous shape, or a rod shape. As used herein, "platy shape" refers to particles having a plate-like or sheet-like geometry and thus being less elongated in one direction, e.g., reflected by a strong shape anisotropy. As used herein, "rod shape" or a "fibrous shape" refers to particles being elongated in one direction (e.g., an axial direction), like a rod or fiber. In some embodiments, platy, fibrous, or rod-shaped filler particles 107 have an aspect ratio of at least 2:1 for at least two cardinal directions (e.g., an axial direction with respect to a second direction perpendicular to the axial direction). In some embodiments, such an aspect ratio is in a range of 2:1 to 5:1. As used herein, an aspect ratio means the ratio between the largest and smallest dimensions corresponding to two of the three cardinal directions of a particle. For example, three relevant cardinal dimensions for an aspect ratio are the length, width, and thickness of a particle, with the aspect ratio determined as the ratio of the largest dimension to the smallest dimension. The aspect ratio of inorganic filler particles 107 can facilitate alignment of inorganic filler particles 107 with respect to each other during mixing and/or extrusion. Such alignment allows for high interconnectivity of the materials forming green shear binder agglomerates 106, and aids in formation of ribbons during extrusion, as discussed below.

Inorganic filler particles 107 can be formed of an inorganic powder mixture that is reactive to form one or more ceramic phases during calcining. In some embodiments, inorganic filler particles 107 comprise at least one of talc, clay, magnesium hydroxide, or alumina particles. In some embodiments, the fraction of inorganic filler particles 107 in green shear binder agglomerates 106 after drying is in a range of 90 wt. % to 99 wt. %, including subranges. For example, the fraction of inorganic filler particles 107 can be 90 wt. %, 91 wt. %, 92 wt. %, 93 wt. %, 94 wt. %, 95 wt. %, 96 wt. % 97 wt. % 98 wt. %, or 99 wt. %, or within a range having any two of these values as endpoints, inclusive of the endpoints, with the remaining fraction comprising the polymeric binder 109.

In some embodiments, the polymeric binder of green shear binder agglomerates 106 comprises an acrylic emulsion (e.g., Duramax™, manufactured by Dow®), a cellulose ether (e.g., Methocel™), polymethylacrylate (e.g., ammonium polymethylacrylate), a polycarbonate ether, a polyalcyl glycol, a polyvinyl, a silicone, a colloidal silica suspension, or a combination thereof. Additional polymeric binder materials suitable for extrusion processes can also be used.

In some embodiments, green shear binder agglomerates 106 comprise a sintering additive. The sintering additive can be an alkali oxide, for example sodium oxide. In general, glass forming materials such as yttrium, cerium, zirconium, molybdenum, boron, or phosphorus can be used as a sintering additive. As discussed below, the sintering additive can promote intermediate firing strength and the structural integrity of a fired article. In some embodiments, green shear binder agglomerates 106 comprises 0.1 wt. % to 0.5 wt. % $Na_2O$ as sintering additive.

In some embodiments, green shear binder agglomerates 106 are formed by a spray drying process. For example, a spray drying machine may be used. Other processes for forming green shear binder agglomerates 106 include, but are not limited to, fusion-spraying or electro-spinning.

Tables 2 and 3, below, include compositions of various spray dried slurries both for cordierite (Table 2) and CMAT (Table 3) compositions. The slurries of Table 2 and Table 3 can be used to form the ceramic beads 102 if subjected to calcining following the spray drying process. Alternatively, the slurries of Tables 2 and 3 can be used to form the shear binder agglomerates 106 if maintained in the green state.

TABLE 1

| Spraydry Slurry Mixture Number (Cordierite) | Kaolin Clay Wt. % | $Mg(OH)_2$ Wt. % | Silica Wt. % | Duramax Binder Wt. % | Duramax Dispersant Wt. % | SL % |
|---|---|---|---|---|---|---|
| SM1 | 77.94 | 19.35 | 9.96 | 2 | 0.2 | 53 |
| SM2 | 77.94 | 19.35 | 9.96 | 3 | 1 | 52 |

TABLE 2

| Spraydry Slurry Mixture Number (CMAT) | Alumina Wt. % | $TiO_2$ Wt. % | Medium Talc (~7 μm) Wt. % | Fine Talc (~3-5 μm) Wt. % | Silica Soot Wt. % | Kaolin Clay Wt. % | Yttria Wt. % | Duramax Binder Wt. % | Duramax Dispersant Wt. % | SL % |
|---|---|---|---|---|---|---|---|---|---|---|
| SM3 | 40.54 | 34.57 | 22.77 | | | 6.85 | 2.12 | 2 | 0.2 | 44 |
| SM4 | 41.2 | 32.69 | 21.53 | | 3.38 | | 2 | 2 | 0.2 | 44 |
| SM5 | 46 | 36.28 | 12.10 | 12.11 | 3.42 | | 2.22 | 2 | 0.2 | 44 |
| SM6 | 40.62 | 43.27 | 11.86 | 7.54 | 2.11 | | 2.14 | 2 | 0.2 | 37 |
| SM7 | 42.69 | 33.89 | 19.46 | | 1.96 | | 2 | 2 | 0.2 | 43 |

While the slurry mixtures SM1-SM7 can be used to form the shear binder agglomerates 106, Table 4, below, provides additional spraydry slurry mixtures for making the green shear binder agglomerates 106 according to some embodiments. The talc filler particles can have a median particle size of approximately 2 μm. The calcined alumina filler particles can also have a median particle size of approximately 2 μm. The hydrated alumina can have a median particle size of approximately 1 μm. Shear binder agglomerate mixtures AM1-AM5 are cordierite-type shear binder agglomerates, e.g., useful for mixing with cordierite-containing beads (such as cordierite or cordierite containing compositions, e.g., CMAT). Agglomerate mixture AM6 is a CMAT-type shear binder agglomerate, e.g., useful for mixing with beads 102 having a CMAT composition to form a CMAT honeycomb article after extrusion and firing.

1B, with the deformed shear binder agglomerates 106 represented by reference numeral 106B.

Figure 4:
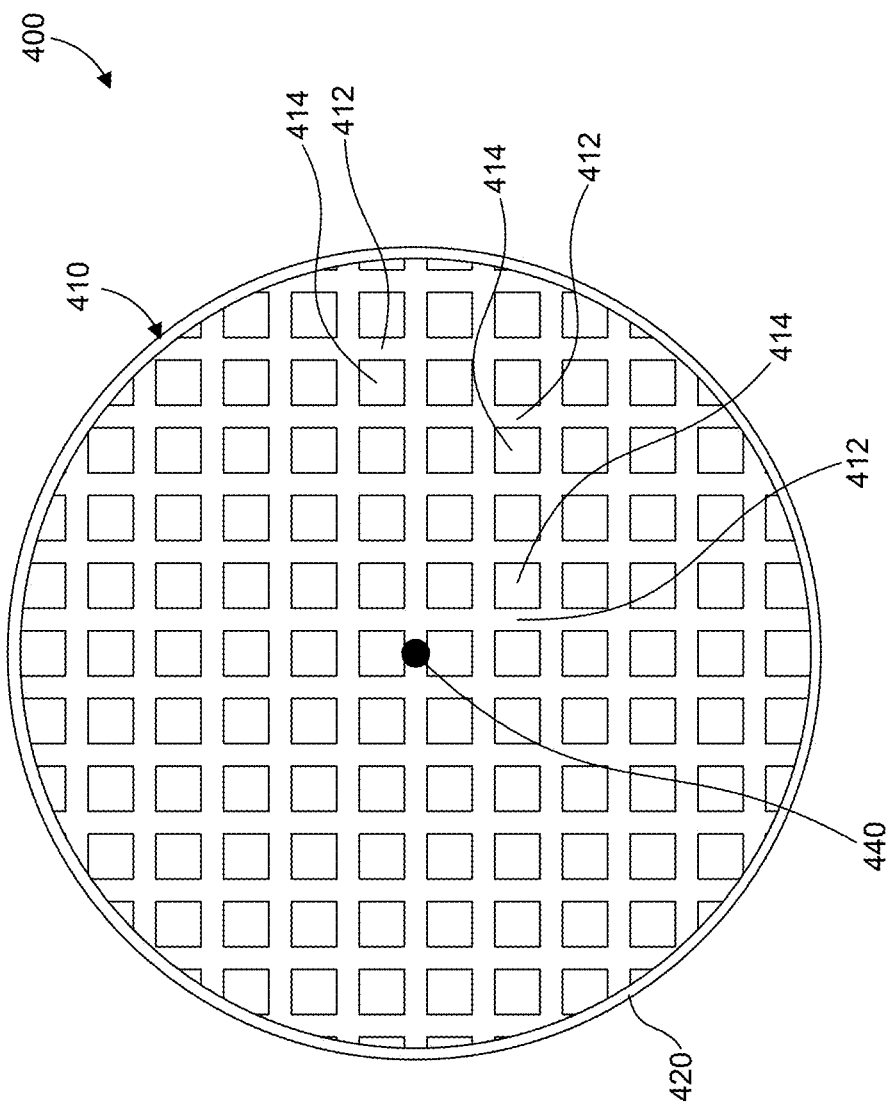
FIG. 4 is a schematic drawing of an extruded body according to some embodiments.

After extrusion, the extruded green body can be dried in step 310 and then fired in step 312 to form a fired ceramic honeycomb body composed of a porous ceramic material (e.g., a honeycomb body is representatively shown in and described with respect to FIG. 4). Firing step 312 may cause sintering of components of the ceramic precursor mixture, such as the ceramic beads and inorganic filler particles. During firing, the pore former particles are removed, e.g., burn off, for example as shown in comparison of FIG. 1C (after firing) to FIGS. 1A-1B (before firing). Additionally,

TABLE 4

| Agglom. Mixture No. | Inorganics WEIGHT PERCENT | | | | | | | | Polymers Wt % Super Addition | | Solid Loading (% vol) |
|---|---|---|---|---|---|---|---|---|---|---|---|
| | Platy Talc | Calcined Alumina | Hydrated Alumina | Silica (d50 = 1-3 μm) | Clay (d50 < 1 μm) | Magnesium Hydroxide (d50 < 5 μm) | Sodium Stearate | TiO2 (d50 < 1 μm) | Y2O3 (milled to <1 μm) | Duramax Binder B1002 | Duramax Dispersant D3005 | |
| AM1 | 49.3 | 17.84 | 14.19 | 17.47 | | | 1.23 | | | 2 | 0.2 | 20 |
| AM2 | | | | 9.29 | 72.67 | 18.04 | | | | 2 | 0.2 | 10 |
| AM3 | | | | 9.29 | 72.67 | 18.04 | | | | 3 | 0.2 | 25 |
| AM4 | 49.9 | 18.06 | 14.37 | 17.68 | | | | | | 2 | 0.2 | 26 |
| AM5 | | | | 9.20 | 72.00 | 17.88 | 0.92 | | | 2 | 0.2 | 21 |
| AM6 | 21.36 | 40.97 | | 3.35 | | | | 32.43 | 1.98 | 2 | 0.2 | 25 |

Figure 3:
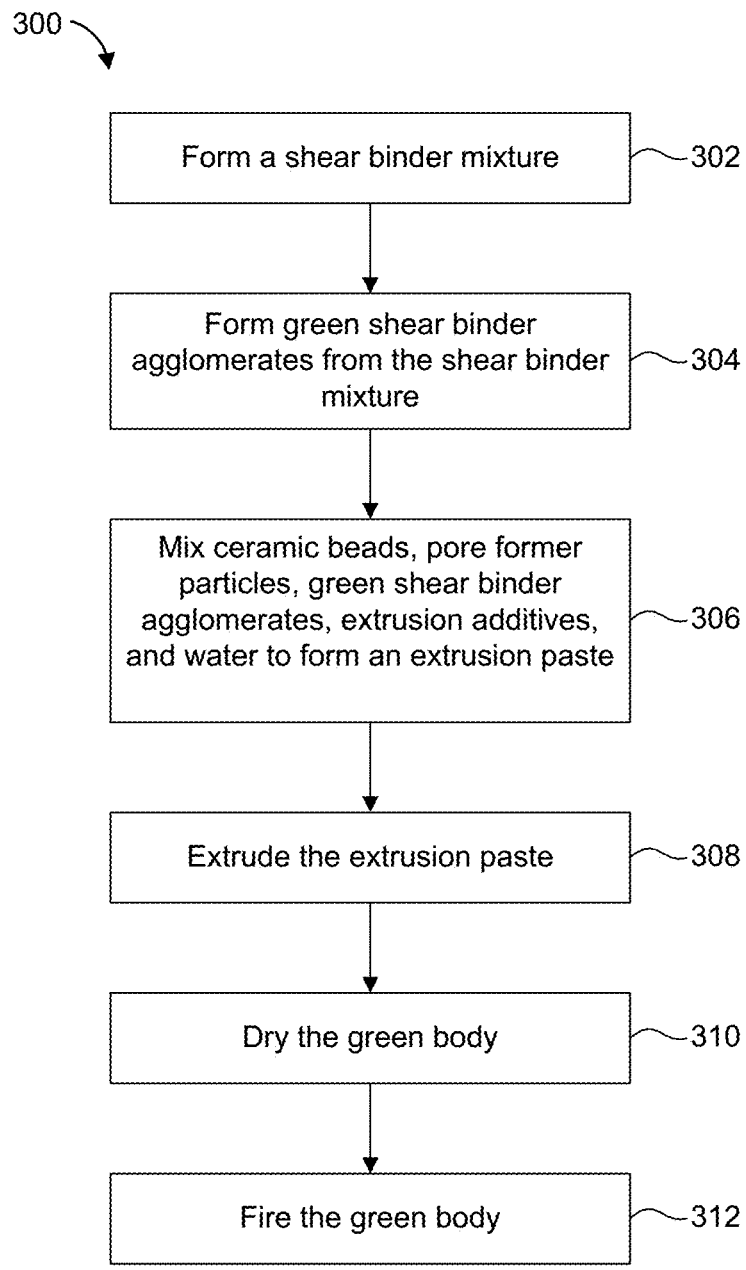
FIG. 3 is a block diagram depicting a method for manufacturing an extruded ceramic body according to some embodiments.

Ceramic precursor mixture 100A can be extruded to form a green body, for example a green honeycomb body, which can then be fired to form a final fired article. FIG. 3 illustrates a method 300 of manufacturing an extruded ceramic body according to some embodiments. In step 302, a shear binder agglomerate mixture (e.g., any of examples SM1-SM7 or AM1-AM6 in Tables 2-4 above) is formed by mixing inorganic filler particles (e.g., filler particles 107) with a polymeric binder (e.g., polymeric binder 109). Additional materials can be added to the shear binder agglomerate mixture, as well, for example as described in Tables 2-4 above. In step 304, the shear binder agglomerate mixture is formed into a plurality of green shear binder agglomerates (e.g., the shear binder agglomerates 106). In some embodiments, the green shear binder agglomerates are formed by a spray drying process. After formation, the green shear binder agglomerates can be mixed with ceramic beads (for example ceramic beads 102), pore former particles (for example pore former particles 104) in step 306. A liquid vehicle such as water, additional extrusion binder (e.g., cellulose), and any extrusion additives can also be added to form an extrusion paste (interchangeably an extrusion mixture, extrusion paste, batch, or batch mixture) in step 306. In some embodiments, an oil is added as an extrusion aid to the extrusion mixture, for example tall oil, oleic acid or other fatty acid.

The extrusion paste is extruded to form a green body in step 308. In some embodiments, the extruded green body formed in step 308 is a green honeycomb body formed by extruding the extrusion mixture through a honeycomb extrusion die. Under the shear forces applied to the paste during extrusion through the die, and/or during mixing before forcing the mixture through the die, the shear binder agglomerates may be deformed and smeared into interbead gaps 108 between adjacent ceramic beads and/or pore former particles. For example, the shear binder agglomerates 106 as shown in FIG. 1A can be smeared by shear forces during mixing and/or extrusion into gaps 108 shown in FIG.

the smeared shear binder agglomerates, for example smeared shear binder agglomerates 106B shown in FIG. 1B, sinter and/or react to form ribbons 106C (interchangeably, bridges or ribbons) from the components of the shear binder agglomerates 106, as illustrated in FIG. 1C. Ribbons 106C extend between, and connect together, adjacent (but still spaced apart) ceramic beads 102 in a fully fired article. As used herein, a "ribbon" structure refers to a ceramic structure that connects to, and forms a bridge between, adjacent ceramic beads within a porous ceramic material 100C of the final fired fired ceramic honeycomb body. The ribbons 106C can bridge interbead gaps 108 to interconnect ceramic beads 102 that are not in direct contact with each other. As such, the ribbons maintain space or interbead gaps 108 between adjacent ceramic beads 102 such that the ceramic beads 102 are not in direct contact. This spacing prevents direct bead-to-bead sintering, which results in a looser packing of the ceramic beads 102 after firing, and thereby increases the porosity of the porous ceramic material 100C of the final fired ceramic honeycomb body.

The polymeric binder within the shear binder agglomerates 106 can also be removed, e.g., evaporate or burn out, during step 312. As a result, ribbons 106C in some embodiments are composed primarily, or even entirely, of the material of inorganic filler particles 107 sintered and/or reacted together. In some embodiments, fired ribbons 106C consist essentially of sintered and/or reacted inorganic filler particles 107. Ribbons 106C can provide a supporting structure between adjacent ceramic beads, and bridge interbead gaps 108 to interconnect beads that are not in direct contact with each other. For example, in some embodiments, less than 50%, 40%, 30%, 20%, or even 10% of ceramic beads 102 are in direct contact with one or more adjacent inorganic beads 102. In some embodiments, at least 50%, 60%, 70%, 80%, or even 90% of the ceramic beads 102 are connected to other ceramic beads via the ribbons 106C, while in further embodiments at least 50%, 60%, 70%, 80%, or even 90% of the ceramic beads 102 are connected to other ceramic beads only via the ribbons 106C. As described herein, the ribbons 106C can be useful to mitigate pore shrinkage during sintering processes (firing), since the ceramic beads are not as easily compressed. Again, since less shrinkage occurs in honeycomb bodies made using the shear binder agglomerates disclosed herein, such honeycomb bodies will have greater porosities than comparative honeycomb bodies made without the shear binder agglomerates.

In some embodiments, ribbons 106C have an average thickness in a range of 3% to 25% of the median bead size, including subranges. In some embodiments, the average thickness is in a range of 3% to 10% of the median bead size of ceramic beads 102, including subranges. For example, the ribbons 106C can have a thickness that is at most 3% of the median bead size of the ceramic beads, at most 4% of the median bead size of the ceramic beads, at most 5% of the median bead size of the ceramic beads, at most 6% of the median bead size of the ceramic beads, at most 7% of the median bead size of the ceramic beads, at most 8% of the median bead size of the ceramic beads, at most 9% of the median bead size of the ceramic beads, or at most 10% of the median bead size of the ceramic beads, or within a range having any two of these values and endpoints, inclusive of the endpoints.

As used herein, the length of the ribbons 106C can be determined as the distance of the interbead gaps 108 through which the ribbons 106C span, while the thickness of the ribbons 106C can correspond to the thickest dimension of the ribbons 106C in a plane perpendicular to the length. In some embodiments the thickness of the ribbons 106C is essentially constant along the length of the ribbons 106C, in which case the thickness can be determined as the average thickness over the entire length. However, in some embodiments, the base of the ribbons 106C at the connection point to the beads 102 may be relatively thick (e.g., due to shearing and smearing against the surface of the beads 102), and in which case, the thickness can be determined as the average thickness of the portion of the length of the ribbons 106C that is spaced at least 25% of the length away from each corresponding bead 102 (i.e., the average thickness of the middle 50% along the length of each ribbon 106C).

In some embodiments, ribbons 106C have an average length in a range of 30% to 100% of the median bead size of ceramic beads 102, including subranges. For example, the ribbons 106C may have a length that is 30% of the median bead size of the ceramic beads, 35% of the median bead size of the ceramic beads, 40% of the median bead size of the ceramic beads, 45% of the median bead size of the ceramic beads, 50% of the median bead size of the ceramic beads, 55% of the median bead size of the ceramic beads, 60% of the median bead size of the ceramic beads, 65% of the median bead size of the ceramic beads, 70% of the median bead size of the ceramic beads, 75% of the median bead size of the ceramic beads, 80% of the median bead size of the ceramic beads, 85% of the median bead size of the ceramic beads, 90% of the median bead size of the ceramic beads, 95% of the median bead size of the ceramic beads, or 100% of the median bead size of the ceramic beads, or within a range having any two of these values and endpoints, inclusive of the endpoints.

The porous ceramic material (e.g., the material 100C) of a fired ceramic body according to embodiments described herein may have a porosity greater than that of porous ceramic materials of a fired body created without the use of green shear binder agglomerates. As shown in FIGS. 2A-2C, when a comparative powder binder, for example powder binder 206 is used in place of the green shear binder agglomerates 106, the packing of inorganic batch beads 202 may collapse. FIG. 2A, for example, shows a comparative ceramic precursor mixture 200A composed of inorganic batch beads 202, pore former particles 204, and a binder powder 206, disposed within interbead gaps 208. Binder powder 206 may be made from a mixture of inorganic materials, for example, a mixture of fine alumina, fine silica, and fine talc, and may have, or result in, a cordierite composition after firing. After extrusion, for example as shown in FIG. 2B, the extruded ceramic precursor mixture 200B maintains generally the same arrangement of components as before extrusion, with powder binder 206 remaining in interbead gaps 208, and not interconnecting inorganic batch beads 202. Accordingly, as shown in FIG. 2C, after firing, when pore former particles 204 are removed, e.g., burned off, there is no remaining support for separating the packing of inorganic batch beads 202. As a result, the batch beads 202 collapse and then sinter together (facilitated by the binder powder 206), in direct contact with each other. This results in wall shrinkage, for example as shown by shrinkage area 210 in FIG. 2C, as well as a reduction in pore size (space between the beads 202) within the fired ceramic material. As discussed above, use of the mixture 100A comprising both ceramic beads 102 and shear binder agglomerates 106 to create the ribbons 106C between the beads 102, assists in preventing or reducing the degree of such shrinkage and pore size reduction.

In some embodiments, the porous ceramic material of the fired body has a porosity of greater than 50%. In some embodiments, the porous ceramic material of the fired body has a porosity of greater than 55%. In some embodiments, the porous ceramic material of the fired body has a porosity of greater than 60%. In some embodiments, the porous ceramic material of the fired body has a porosity of greater than 65%. Porosity can be measured by mercury infiltration. For example, porosity, median pore diameter, and pore size distribution measurements determined with a mercury intrusion porosimeter. Values reported herein were obtained from an Autopore IV 9500 porosimeter with software from Micromeritics. The mercury intrusion porosimetry method uses the capillary law with non-wetting liquid and cylindrical pores as may be expressed with the Washburn equation: $D=-(1/P)4y \cos \emptyset$, where D is the pore diameter, P is the applied pressure, y is the surface tension and $\emptyset$ is the contact angle. The volume of mercury is directly proportional to the pressure. Data reduction used the differential and log differential to calculate the first derivative of the cumulative specific intrusion volume as a function of calculated log diameter. Porosity is one output, the mercury pore size distribution another. The mercury pore size indicates the bottleneck channel for each mercury infiltration step and does not correspond to the geometrical pore size. In some embodiments, the porous ceramic material of the fired body has a porosity in the range of 50% to 75%, including subranges. For example, the porous ceramic material of the fired body can have a porosity of at least 50%, at least 55%, at least 60%, at least 65%, at least 70%, or at least 75%, or within a range having any two of these values as endpoints, inclusive of the endpoints.

FIG. 4 illustrates a fired, porous honeycomb body 400 according to some embodiments. Honeycomb body 400 includes a matrix 410 of cells defined by a porous ceramic material, for example the porous ceramic material formed by firing of an extruded ceramic precursor mixture, such as ceramic precursor mixture 100A. Matrix 410 can have a circular cross-section as illustrated in FIG. 4. However, in some embodiments, the cross-sectional shape of honeycomb body 400 can an ellipse, an oval, a triangle, a tri-lobed shape, a square, a rectangle, or any other suitable shape. Each cell 414 within matrix 410 is defined by intersecting porous walls 412. In the illustrated embodiment, the walls 412 extend parallel with respect to each other along all three cardinal axes, e.g., a y-axis, x-axis, and z-axis. The z-axis extends through the center of honeycomb body 400, for example at point 440, parallel to the direction in which honeycomb body 400 was extruded, and thus may be referred to as an longitudinal axis of the honeycomb body 400. In some embodiments, honeycomb body 400 also includes a skin 420, also defined by a ceramic material and surrounding matrix 410 on an outer radial periphery of honeycomb body 400.

In some embodiments, the porous ceramic material of the walls 412 of the honeycomb body 400 are loaded with a catalytic material; however, honeycomb body 400 can alternative be bare (uncoated). Honeycomb body 400 loaded with catalytic material can be used in a catalytic converter assembly, for example in an exhaust system for an internal combustion engine. Whether coated with a catalytic material or bare, honeycomb body 400 can be used as a particulate filter (e.g., including alternating ones of the cells 414 plugged at opposite end faces of the honeycomb body 400).

Prior to firing, an extruded green body used to produce the fired honeycomb body 400 can have substantially the same honeycomb geometry as described with regard to the fired honeycomb body 400. For example, an extruded green body can include a matrix having a plurality of cells and a skin surrounding the matrix as illustrated in FIG. 4. The green honeycomb body can be made from a ceramic precursor mixture, for example ceramic precursor mixture 100A, including ceramic beads, pore former particles, and green shear binder agglomerates. As described above, the green shear binder agglomerates can include inorganic filler parties and at least one polymeric binder. Also as described above, the inorganic filler particles can have an anisotropic or high aspect ratio shape, for example a platy shape or a rod shape, which assists in deforming into and maintaining the form of bridges or ribbons during shearing. The shear binder agglomerates of the green body can be deformed to bridge or span across a plurality of interbead gaps between adjacent ceramic beads and/or pore former particles. As described herein, during mixing and/or extrusion of the green body, these shear binder agglomerates are smeared into interbead gaps between adjacent ceramic beads and/or pore former particles. As described herein, the shear binder agglomerates can be useful to improve the stability of the green honeycomb body during firing, while also creating ribbons or bridges that decrease packing of the ceramic beads and increase porosity of the fired ceramic article.

Furthermore, in some embodiments, the wall thicknesses of the intersecting walls of the green honeycomb body and the wall thicknesses of the intersecting walls 412 of the fired honeycomb body do not differ by more than 5%, thereby maintaining the porosity created by the pore former particles. For example, an average thickness of the intersecting walls 412 of the fired honeycomb body may can be no less than 90%, or more preferably, 95% of an average thickness of the intersecting walls of the green honeycomb body.

EXAMPLES

Embodiments will be further clarified in the following Examples. These Examples are not limiting to the embodiments described above. Various batch mixtures for extrusions of honeycomb bodies were tested according to methods as described. Thus, the Examples are provided as examples of honeycomb body batch mixtures. For example, Table 5, below, summarizes batch mixtures used to create one inch extrusions of spray dried pre-reacted cordierite beads (e.g., beads 102) with various binders, such as shear binder agglomerates (e.g., the shear binder agglomerates 106). For the purposes of discussion and for determining weight percentages, the shear binder agglomerates are considered part of the inorganic components (despite comprising polymeric binder materials that can be organic in nature). Consistently throughout the Tables, the weight percent and any super addition thereto is determined with respect to the inorganics (i.e., the sum of the pre-reacted beads and the shear binder agglomerates, or the sum of the pre-reacted beads and the inorganic binder, as applicable to each Example). Consistently throughout the Tables, pore formers, organic binders, and liquid additions, are all provided as super addition with respect to the total weight of the inorganics.

As summarized throughout the Tables below, it was found that particularly useful shear binder agglomerates tested included those of relatively small sizes (e.g., d50 in the range of 18-25 μm), shear binder agglomerates made from agglomerate mixture AM1, those containing relatively higher talc levels, and/or those including a sintering aid such as sodium.

In order to form the green shear binder agglomerates for the Examples, a spray dryer was used. Green shear binder agglomerate slurries (e.g., agglomerate mixtures AM1-AM6 of Table 4) were processed with a high shear Ross inline mixer with a square-holed rotor stator. First, water and dispersant, for example Duramax® D3005, were loaded into the large vessel of the mixer. Then, the mixer was set to run at 60 Hz and turned on such that the water and dispersant were circulating through the rotor stator and back to the vessel. The raw materials of the green shear binder agglomerates were added directly into the rotor stator via the mixer's feed cone. The raw materials were generally added in the following order, if needed for a batch mixture: yttria, alumina, titanium dioxide (alternating with alumina to minimize foaming), talc and/or clay, and silica. Although the raw materials were added according to the preceding order, in some batch mixtures, the raw materials may be added in a different order. Once all of the dry materials were added, the rotor stator was turned off, and the slurry was stirred by a blade stirrer at a rate of 80 rpm-100 rpm. Binder, for example Duramax® B1002, was then added directly to the vessel, and the slurry was stirred for another 15 minutes before spray drying. Example solids loadings are provided in Table 1 for agglomerate mixtures AM1-AM6, although other solids loadings can be utilized.

As discussed above, slurries were spray dried using a spray dryer with a rotary atomizer nozzle at a rotation rate of approximately 29,950 rpm. The inlet temperature was set to 200° C., and the cyclone temperature was set to 98° C., which resulted in a slurry feed rate of approximately 16 kg/hr-20 kg/hr.

The spray-dried product was separated in two outlet streams. Large spray dried agglomerates of the green shear binder were collected from the chamber, and fine agglomerates were collected from the cyclone, which assisted in enabling large and small median agglomerate sizes to be obtained.

As described in Tables 2-4 above, the shear binder agglomerates in the Examples were chosen from either cordierite-type (e.g., Table 2 and agglomerate mixtures AM1-5 of Table 4) or CMAT-type (e.g., Table 3 and agglomerate mixture AM6 in Table 4) binders. In accordance with the Examples, and summarized in more detail below, cordierite-type mixtures were used as shear binder agglomerates in cordierite pre-reacted bead extrusion batches. CMAT-type mixtures were used as shear binder agglomerates for CMAT pre-reacted bead extrusion batches. For some batches, cordierite-type compositions were also used as shear binder agglomerates for CMAT pre-reacted beads.

Figure 12:
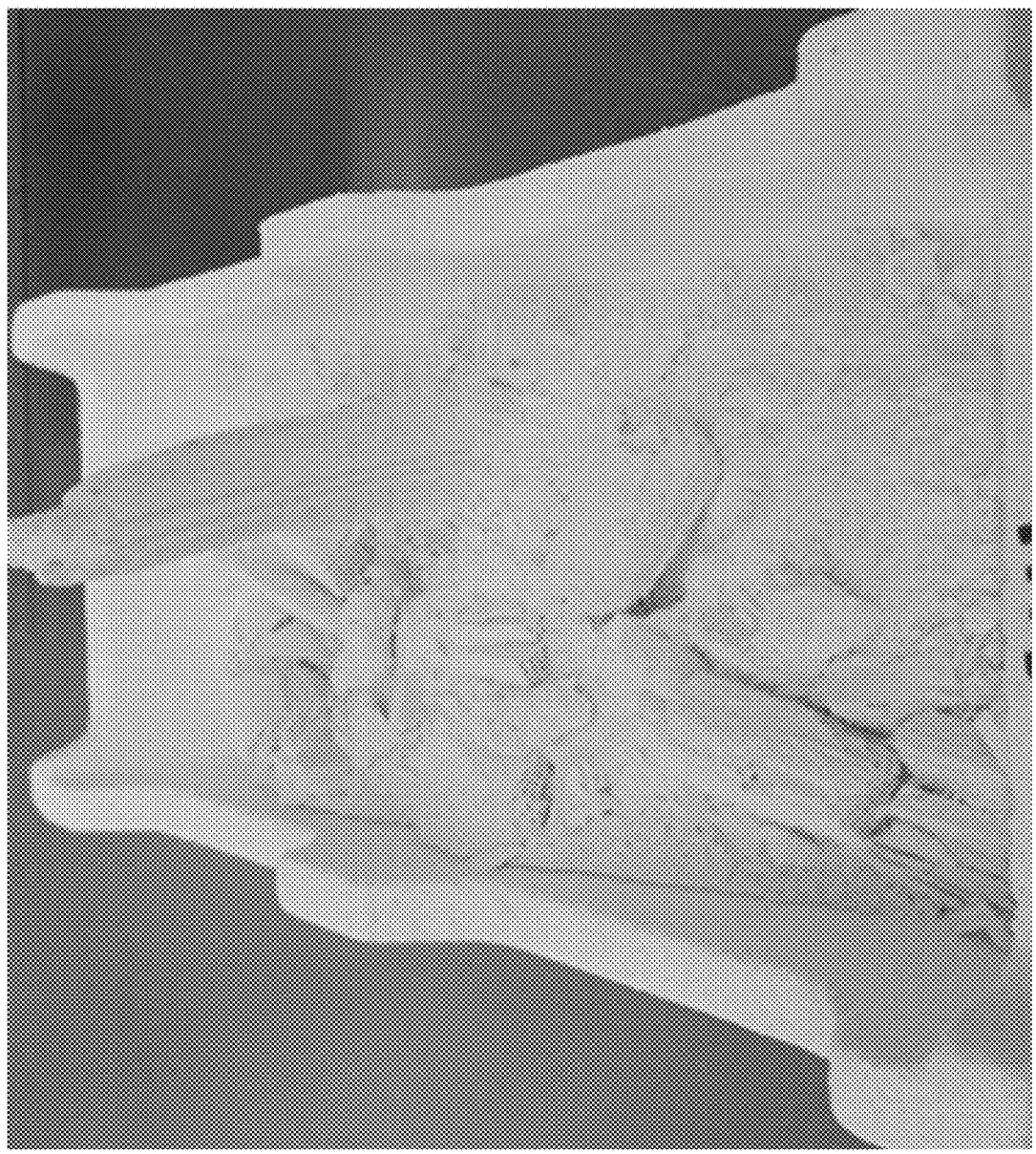
FIG. 12 is a photograph of various test samples of fired honeycomb articles.

The bead mixtures BM1-BM2 for the beads in Table 5 correspond to those given in Table 1, above. The median bead size for the beads is provided in parenthesis with units of micrometers. The compositions AM1, AM2 for the shear binder agglomerates correspond to those given in Table 4, above. The median agglomerate size of the shear binder agglomerates are also provided in micrometers. Powderization, as noted in the below Tables, refers to a honeycomb body that could not maintain shape after firing, i.e., at least partially crumbling into powder. FIG. 12 illustrates multiple fired honeycomb bodies in various states of powderization (e.g., some are fully powderized into powder, while others have sections of honeycomb channel structure that has not been fully powderized). The extruded articles of Table 5 were fired to a top temperature of 1340° C. for four hours.

TABLE 5

| MATERIAL | | Example Number: | | | | | |
|---|---|---|---|---|---|---|---|
| | | 1 | 2 | 3 | 4 | 5 | 6 |
| | | WEIGHT PERCENT | | | | | |
| PREREACTED CORDIERITE BEADS | BM1 (45 μm) (1350 C./10 h) | 90 | 90 | 90 | | | |
| | BM3 (50 μm) (1350 C./10 h) | | | | 90 | 90 | 90 |
| | BM2 (48 μm) (1380° C./8 h) | | | | | | |
| SHEAR BINDER AGGLOMERATE | AM1 20 μm median agglomerate size | 10 | | | | | |
| | AM1 50 μm median agglomerate size | | 10 | | | | |
| | AM1—rock milled (fragments <10 μm median agglomerate size) | | | 10 | | | |
| | AM2 20 μm median agglomerate size | | | | 10 | | |
| | AM2 40 μm median agglomerate size | | | | | 10 | |
| | AM2—rock milled cyclone (fragments <10 μm median agglomerate size) | | | | | | |
| INORGANIC BINDERS | Alumina | | | | | | 3.25 |
| | Talc | | | | | | 4.29 |
| | Colloidal Silica | | | | | | 6.16 |
| | | Super Addition | | | | | |
| PORE FORMERS | Crosslinked Pea Starch | 18 | 18 | 18 | 18 | 18 | 18 |
| | Graphite | 9 | 9 | 9 | 9 | 9 | 9 |
| ORGANIC BINDERS | Hydroxypropyl Methylcellulose F240 LF | 3 | 3 | 3 | 3 | 3 | 3 |
| | Hydroxypropyl Methylcellulose TYA 118 | 6 | 6 | 6 | 6 | 6 | 6 |
| LIQUD ADDITIONS | Fatty Acid, Tall Oil | 0.75 | 0.75 | 0.75 | 0.75 | 0.75 | 0.75 |
| GREEN EXTRUDED HONEYCOMB QUALITY | | good | good | good | good | good | good |
| FIRED HONEYCOMB QUALITY | 1340° C./ 4 h | good | good | good | powderized in top outer region | powderized in extended top areas | strongly powderized |

The honeycomb body mixtures shown in Table 5 included pre-reacted cordierite beads having mean bead sizes of 45 μm, 50 μm, and 48 μm. In these Examples, green spray dried agglomerates having cordierite-type mixtures were used as the shear binder agglomerates. The sizes and mixtures of the agglomerates were varied, however, all honeycomb body batches were composed of 90 wt % pre-reacted cordierite beads and 10 wt % green spray dried agglomerates, with 18 wt % crosslinked pea starch (pore former) as super addition (as noted above, all super additions with respect to the total weight of the inorganics, i.e., shear binder agglomerates plus beads), 9 wt % graphite (pore former) as super addition, 9 wt % methocal (cellulose binder) as super addition, and 0.75 wt % oil (extrusion aid) as super addition, in an aqueous paste with an amount of water in super addition as a liquid vehicle suited for paste extrusion. Example 6 in Table 5 was provided as a comparative that did not utilize any shear binder agglomerates.

In Examples of Table 5, a green spray dried agglomerate of a cordierite composition was used as shear binder; agglomerate size and composition were varied as indicated. The inorganic binder in a reference batch (Example 6, which did not include any shear binder agglomerates) was composed of a mixture of fine powders of alumina, talc and silica. This reference batch of Example 6 resulted in a honeycomb article that strongly powderized.

Talc-rich, sodium-containing (e.g., 1% sodium stearate) green shear binder agglomerates according to agglomerate mixture AM1 was used in three different agglomerate sizes: 20 μm agglomerates, 50 μm agglomerates, and less than 10 μm rock-milled agglomerate fragments. Clay rich, Na-free shear binder agglomerates according to agglomerate mixture AM2 were also used in three different sizes: 20 μm agglomerates, 40 μm agglomerates, and less than 10 μm rock-milled agglomerate fragments. Agglomerate mixture AM1 showed consistently excellent results, while Examples utilizing agglomerate mixture AM2 showed various degrees of powederization. For example, as discussed above, it is believed that high aspect ratio raw materials, e.g., comprising rods and plates, such as talc (as included in agglomerate mixture AM1 but not agglomerate mixture AM2), advantageously align under shear stress, thereby providing higher interconnectivity of the fine raw material particles in the shear ribbons, which results in ribbons that provide a stronger interconnection between the ceramic beads.

FIGS. 8A-8F respectively show SEM views of matrix wall cross-sections of extruded green honeycomb articles made from the Examples 1-6 of Table 5. FIGS. 8A-8F each show SEM images of a cross-section of various microstructures, at three different magnifications. For example, SEM image 810A is at a first magnification, image 820A is a second, higher magnification, and image 830A is at a third, highest magnification. This labeling convention is consistant for each of FIGS. 8A-8F.

Figure 8A:
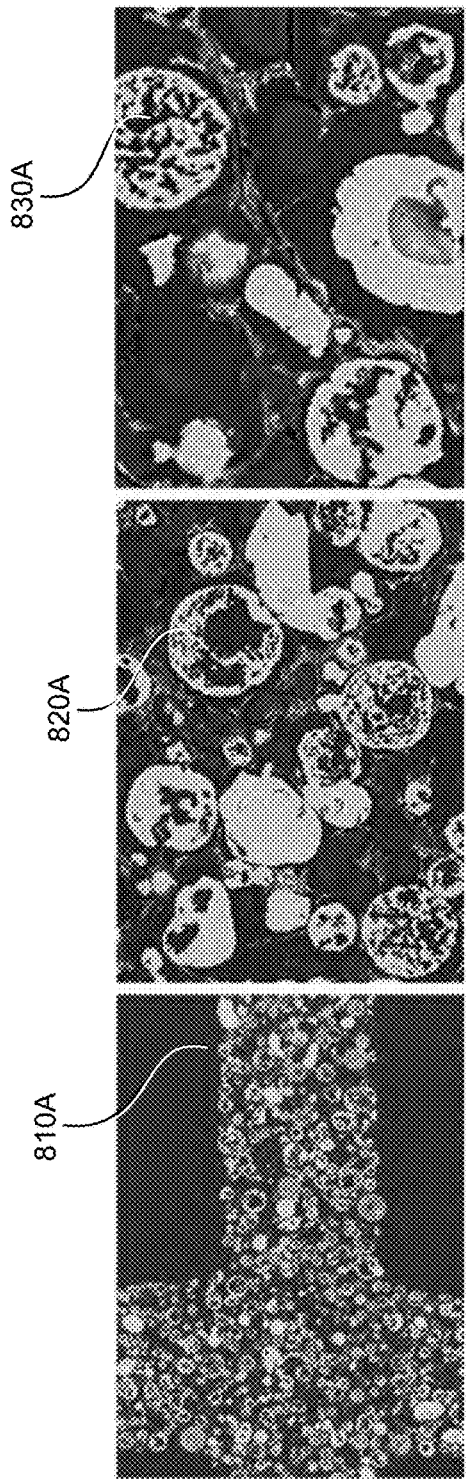
FIGS. 8A-8F are SEM images of various test samples of green porous ceramic articles.
Figure 8B:
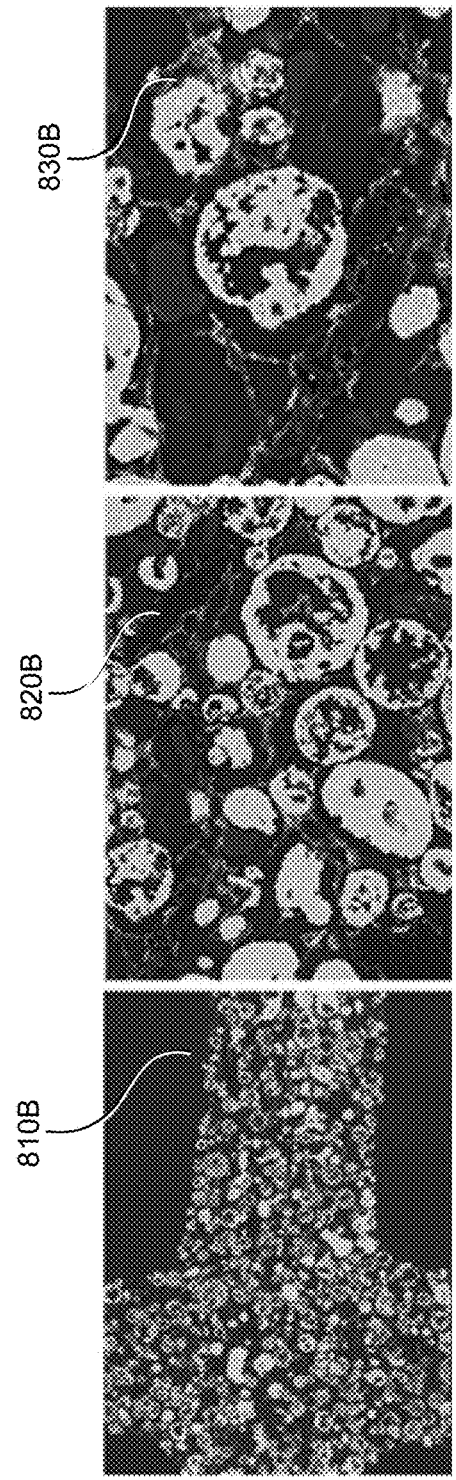
Figure 8C:
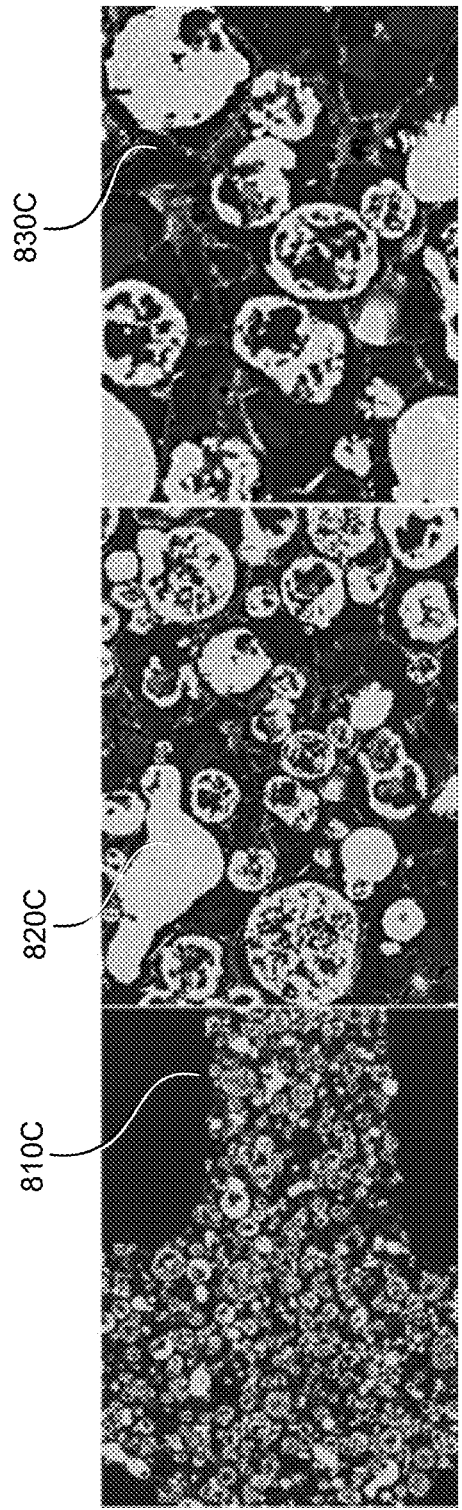
Figure 8D:
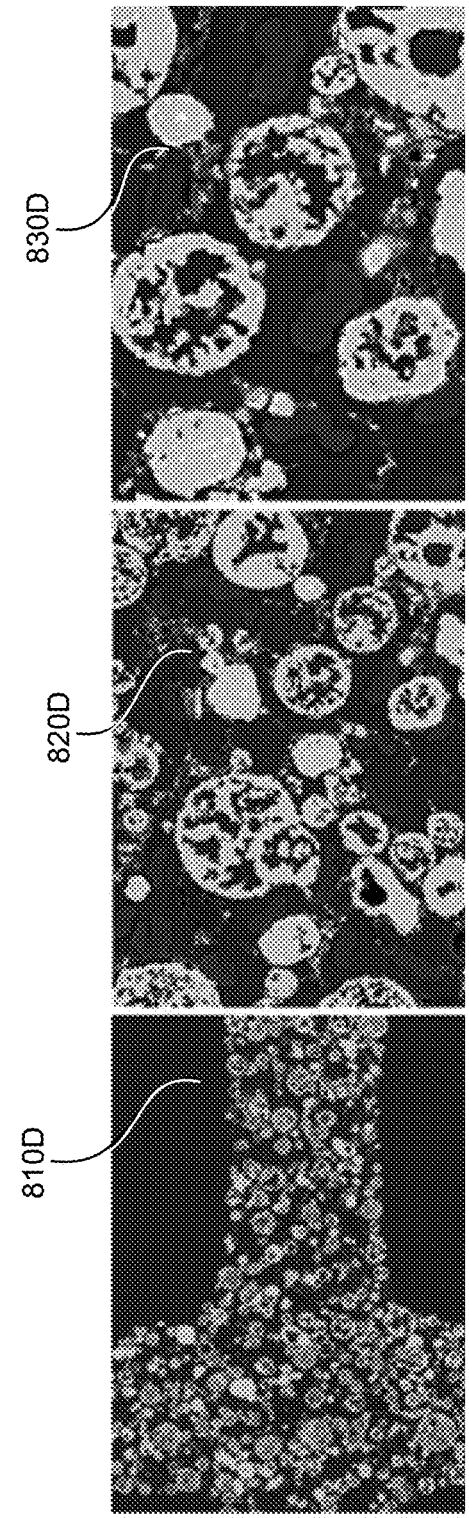
Figure 8E:
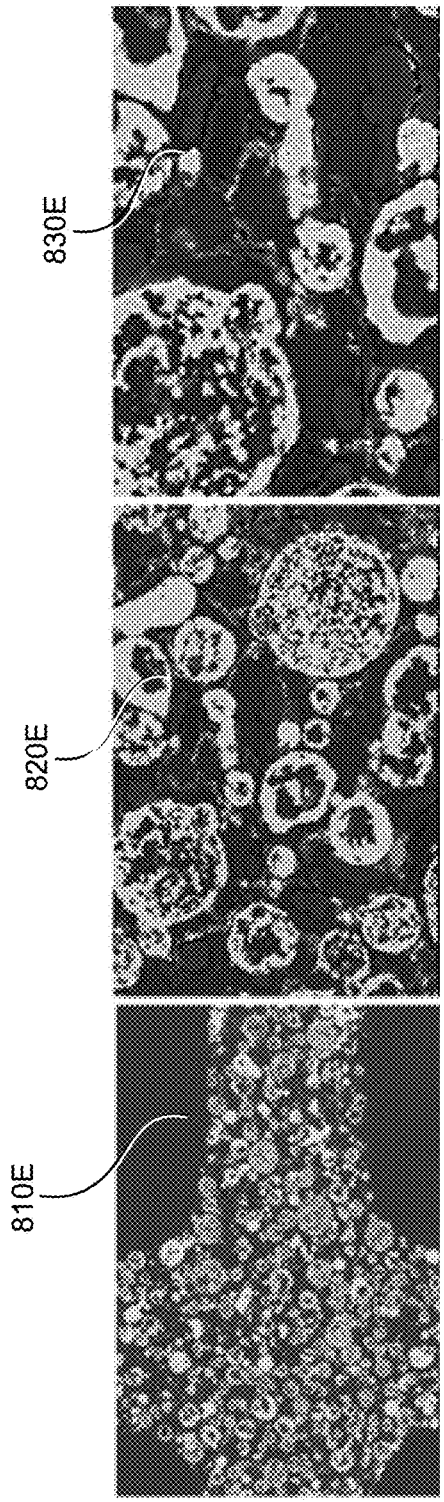
Figure 8F:
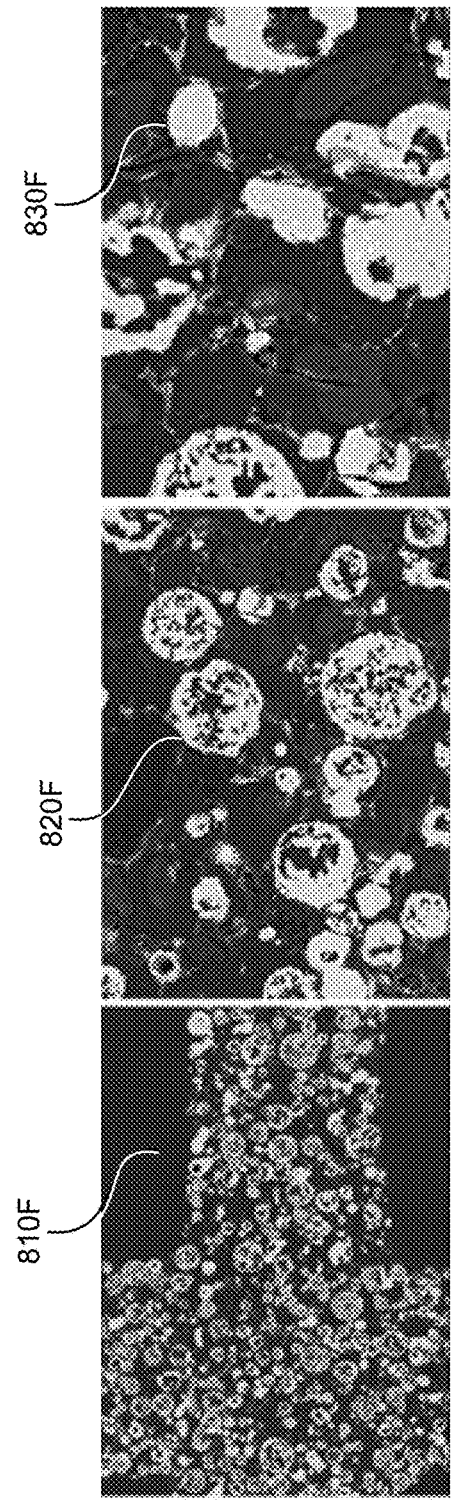
Figures 9A, 9B:
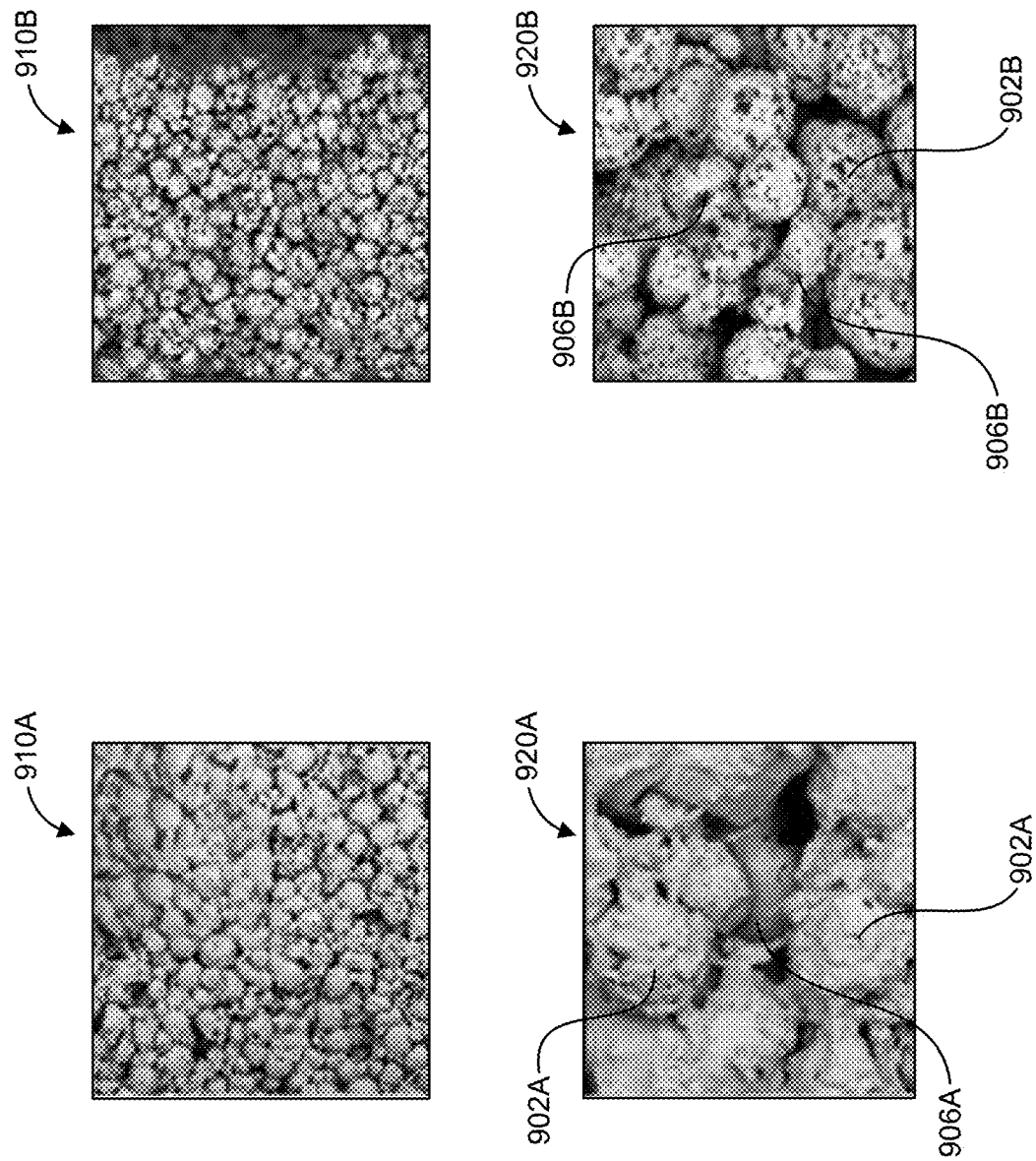
FIGS. 9A-9D are SEM images of wall surfaces of various test samples of fired porous ceramic articles.
Figures 9C, 9D:
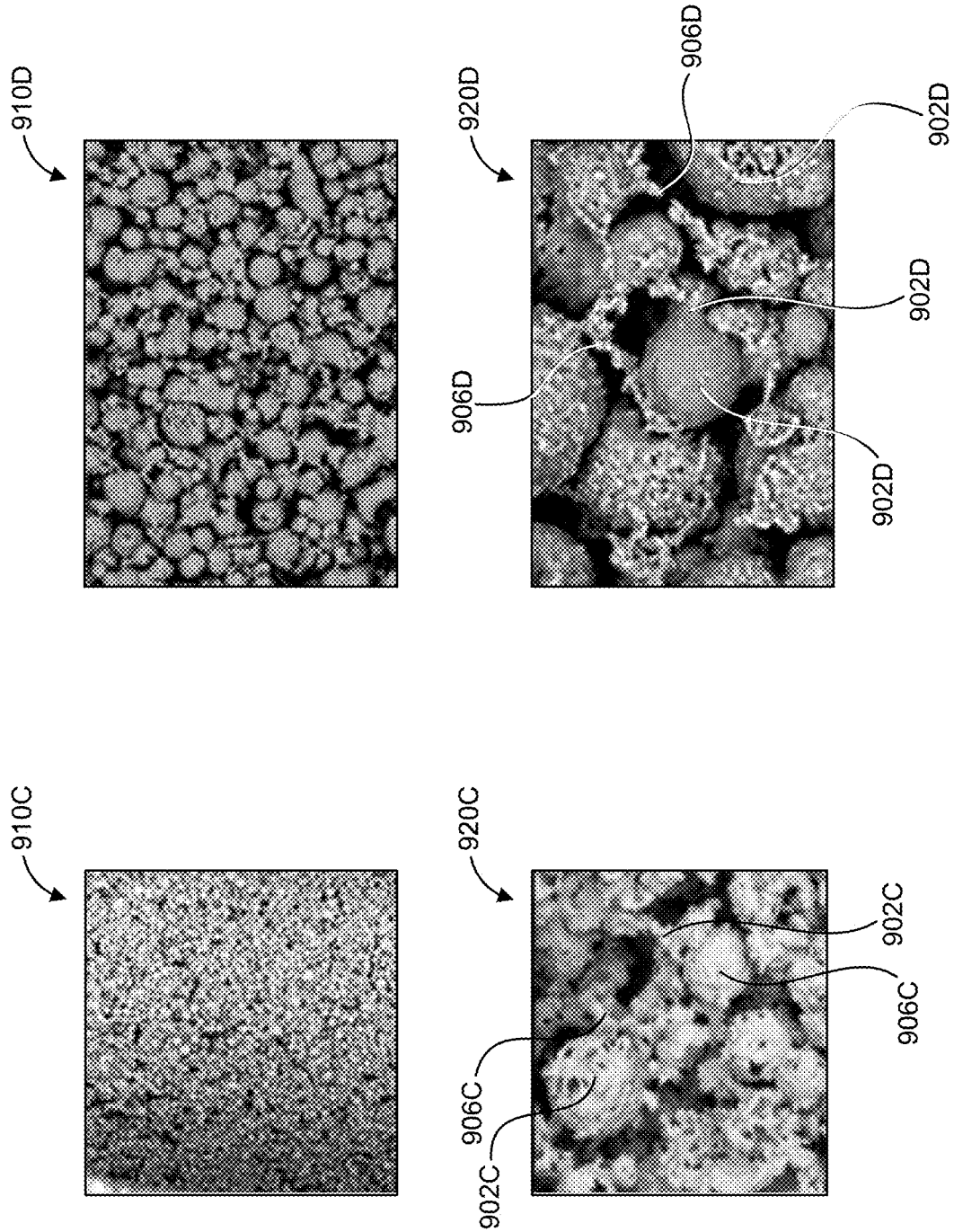

As shown in SEM images 810A, 810C, and 810D in FIGS. 8A, 8C, and 8D respectively, (thus corresponding to Examples 1, 3, and 4), the smaller agglomerate sizes (e.g., smaller median agglomerate sizes and/or milled and fragmented spray dried particles) exhibited good smearing and were regularly distributed over surfaces of, and interfaces between, the ceramic beads. This can be seen more clearly at the higher magnifications in SEM images 820A, 820C, and 820D, and in SEM images 830A, 830C, and 830D. Conversely, honeycomb bodies produced by batches comprising larger spray dried agglomerates, for example Examples 2 and 5, provided an inhomogeneous distribution of the smeared films with many non-covered interfaces and thickened areas, as shown in FIGS. 8B and 8E, respectively. Particularly good surface and interface coverage was achieved with fine talc and sodium-containing agglomerates made from agglomerate mixture AM1. Relatively poor surface and interface coverage (many interfaces not covered at all) occurred with comparative mixtures of fine raw materials that were not arranged into shear binder agglomerates, as shown in FIG. 8F for Example 6.

As shown, articles made with very fine (rock milled fragments in Example 3), fine (median agglomerate size of 20 μm in Example 1), and course (median agglomerate size of 50 μm in Example 2) shear binder agglomerate mixture AM1 (which is both rich in platy talc and contains 1% sodium stearate) all showed excellent fired honeycomb quality, with no visible powderization. In comparison, articles made with sodium-free, clay-rich spray dried shear binder, for example fired honeycomb articles made from agglomerates according to agglomerate mixture AM2, as in Examples 4 and 5, respectively, did not fully powderize, but showed a high loss of part integrity, experiencing an onset of powderization, visible as doming, peeling, and splitting. This loss of integrity is despite the high degree of smearing in Example 4. In sum, the green spray dried shear binder agglomerates (Examples 1-5) performed better than fine powder mixtures (Example 6), and the addition of sodium and talc (Examples 1-3) in the agglomerates strongly promoted firing success and integrity of the fired articles.

Additional examples of cordierite-based batch mixtures are summarized in Table 6, below. Similar to Table 5, Table 6 utilizes bead and agglomerate mixtures from Tables 1-4 and provides median bead sizes and median agglomerate sizes in micrometers. A comparative reference, including a fine powder mixtures of fine alumina, silica, and fine talc was used as an inorganic binder, is also summarized in Example 13.

TABLE 6

| | | Honeycomb Batch Example Number: | | | | | | |
|---|---|---|---|---|---|---|---|---|
| | | 7 | 8 | 9 | 10 | 11 | 12 | 13 |
| Material | | WEIGHT PERCENT | | | | | | |
| PRE-REACTED CORDIERITE | BM1—40 um (1365 C./8 h) | 95 | 90 | 95 | 90 | 95 | 90 | 95 |
| SHEAR BINDER AGGLOMERATE | AM1—green spray dried (20 μm median agglomerate size) | 5 | 10 | | | | | |
| | AM5—green spray dried (20 μm median agglomerate size) | | | 5 | 10 | | | |

TABLE 6-continued

| | | Honeycomb Batch Example Number: | | | | | | |
|---|---|---|---|---|---|---|---|---|
| | | 7 | 8 | 9 | 10 | 11 | 12 | 13 |
| Material | | WEIGHT PERCENT | | | | | | |
| INORGANIC BINDER | AM2—green spray dried (20 μm median agglomerate size) fine premix alumina, silica, talc (no Na) | | | | | 5 | 10 | 5 |
| | | Super Addition | | | | | | |
| PORE FORMERS | Graphite | 6 | 6 | 6 | 6 | 6 | 6 | 6 |
| | Crosslinked Pea Starch | 12 | 12 | 12 | 12 | 12 | 12 | 12 |
| | Methocel F240 | 2 | 2 | 2 | 2 | 2 | 2 | 2 |
| | Methocel TYA 115 | 4 | 4 | 4 | 4 | 4 | 4 | 4 |
| | Tall Oil | 0.5 | 0.5 | 0.5 | 0.5 | 0.5 | 0.5 | 0.5 |
| GREEN EXTRUDED HONEYCOMB QUALITY | | good | good | good | good | good | good | good |
| FIRED HONEYCOMB QUALITY | Firing 1380° C./4 h | good | good | cracks and skin powderizing | ok | powderized | good | bad with powderization |

According to Table 6, honeycomb articles were made from batch mixtures for cordierite honeycomb extrusions including inorganic cordierite ceramic beads made from a sodium-containing cordierite bead mixture (BM1), mixed with shear binder agglomerates made from agglomerate mixtures AM1, AM5, and AM2 (with a median size of approximately 20 μm). The batch mixtures of Examples 7-13 were extruded into 2-inch extruded honeycomb articles with good green quality. All of the green honeycomb articles created from Examples 7-13 were fired at 1380° C. for 4 hours. Firing success varied with type and quantity of the shear binder agglomerate.

Figure 11:
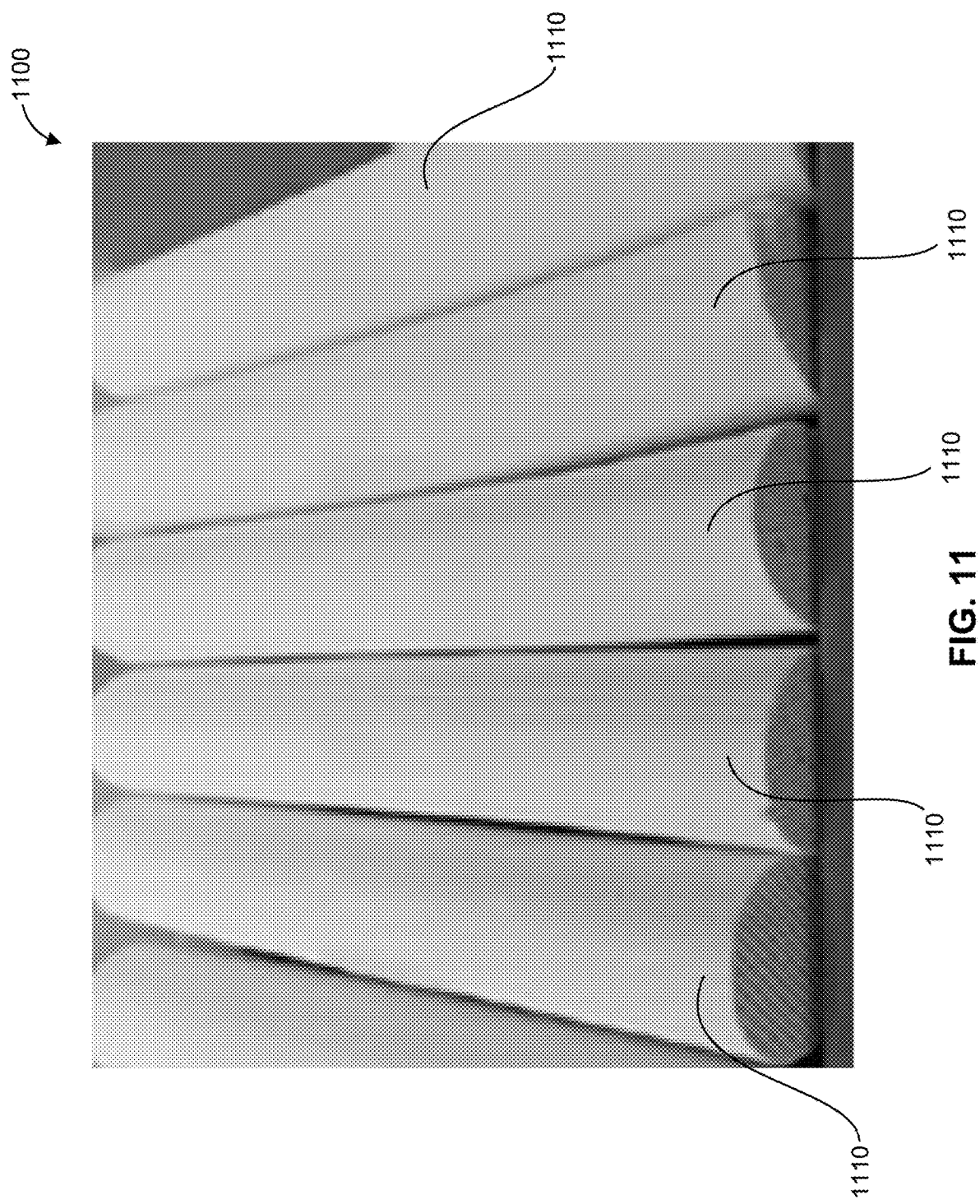
FIG. 11 is a photograph of various test samples of fired honeycomb articles.

All honeycomb articles made with 10% or 15% shear binder agglomerates showed good fired quality. However, honeycomb articles made with 5% shear binder agglomerates were only successfully fired with agglomerates according to agglomerate mixture AM1, which is again a talc and sodium containing mixture, as shown for Example 7. Honeycomb articles 1110, shown in FIG. 11, survived firing and provided good honeycomb article quality.

Example 9 also included 5% of shear binder agglomerates, but utilized agglomerate mixture AM2, which produced an article with cracks and skin powderization. Without being bound to theory, it is believed that agglomerate mixture AM1 provided superior results because it is composed of raw materials that comprise platy talc and sodium. Sodium-free shear binder agglomerates made by agglomerate mixture AM2 at 5% level did not provide sufficient structural support during firing; as shown in Example 11, the fired article was fully powderized. The extruded honeycomb article made with addition of a 5% fine powder mixture instead of the shear binder agglomerate also showed stages of powderization, as indicated for Example 13. The articles made with fine powder mixture (Example 13) also exhibited extreme shrinkage of its initial wall thickness. For example, the honeycombs of Example 13 showed a porosity of only 55%-57%, with a median pore size of 6 μm, while honeycomb articles made from batches having the same weight percent and composition ceramic beads, but including shear binder agglomerates (Examples 7, 9, 11), maintained an open bead packing and reached porosities of up to 65%, with a median pore size in the range of 10 μm-13.5 μm.

Further examples of cordierite-based batch mixtures are summarized in Tables 7A-7B, below. Tables 7A-7B utilize mixtures from Tables 1-4 for the pre-reacted beads and shear binder agglomerates. Median bead sizes and median agglomerate sizes are provided in micrometers. All Examples in Tables 7A-7B produced good quality honeycomb articles.

TABLE 7A

| | | Batch Example Number: | | | | | | | | | |
|---|---|---|---|---|---|---|---|---|---|---|---|
| | | 14 | 15 | 16 | 17 | 18 | 19 | 20 | 21 | 22 | 23 |
| EXTRUSION TYPE (2") TWS—Twin Screw Extruder RAM—Ram Extruder | | RAM | TWS | TWS | RAM | RAM | RAM | TWS | TWS | TWS | TWS |
| GEOMETRY (approx. cells per square inch/wall thickness in mils) | | 300/15 | 300/15 | 300/15 | 300/15 | 300/15 | 300/15 | 300/15 | 300/15 | 300/8 | 300/8 |
| | | INORGANICS (weight percent) | | | | | | | | | |
| SPRAY DRIED/PRE-REACTED CORDIERITE | BM1 (50 μm) | 85 | | | | | | | | | |
| | BM1 (48 μm) | | | | 90 | 90 | 90 | | | 85 | 85 |
| | BM1 (45 μm) | | | 85 | 85 | | | | | | |
| | SM1 (18 μm) | | | | | | | | | | |

TABLE 7A-continued

| | | Batch Example Number: | | | | | | | | | |
|---|---|---|---|---|---|---|---|---|---|---|---|
| | | 14 | 15 | 16 | 17 | 18 | 19 | 20 | 21 | 22 | 23 |
| BEADS (median bead size) | SM1 (30 μm) | | | | | | | 85 | | 85 | |
| | SM1 (35 μm) | | | | | | | | | | |
| | SM2 (45 μm) | | | | | | | | | | |
| SHEAR BINDER AGGLOMERATE | AM1 (20 μm) | 15 | 15 | 15 | 10 | 10 | 10 | 15 | 15 | 15 | 15 |
| PORE FORMERS (weight percent super addition) | | | | | | | | | | | |
| Corn starch | | | | 16 | | | | | | | |
| Crosslinked pea starch | | 18 | 16 | | 16 | 18 | 18 | 18 | 22 | 18 | 22 |
| Graphite | | 9 | 8 | 8* | 8 | 9 | 9 | 9 | 9 | 9 | 9 |
| *Fine graphite | | | | | | | | | | | |
| ORGANIC BINDERS (weight percent super addition) | | | | | | | | | | | |
| Hydroxypropyl Methylcellulose F240 | | 3 | 3 | 3 | 2 | 3 | 3 | 3 | 3 | 3 | 3 |
| Hydroxypropyl Methylcellulose TYA | | 6 | 6 | 6 | 4 | 6 | 6 | 6 | 6 | 6 | 6 |
| LIQUID ADDITIONS (weight percent super addition) | | | | | | | | | | | |
| Colloidal Silica (Ludox AS40) | | | | | 2 | | | | | | |
| Tall Oil | | 0.75 | 0.75 | 0.75 | 0.75 | 0.75 | 0.75 | 0.75 | 0.75 | 0.75 | 0.75 |
| Water Call | | 57.5 | 32 | 34 | 50 | 34 | 40 | 55 | 48-50 | 50 | 43 |

TABLE 7B

| | | Batch Example Number: | | | | | | | | | |
|---|---|---|---|---|---|---|---|---|---|---|---|
| | | 24 | 25 | 26 | 27 | 28 | 29 | 30 | 31 | 32 | 33 |
| EXTRUSION TYPE (2") TWS—Twin Screw Extruder | | TWS | TWS | TWS | TWS | TWS | TWS | TWS | TWS | TWS | TWS |
| GEOMETRY (approx. cells per square inch/wall thickness in mils) | | 300/8 | 300/8 | 300/8 | 300/8 | 300/8 | 300/8 | 300/8 | 300/8 | 300/8 | 300/8 |
| INORGANICS (weight percent) | | | | | | | | | | | |
| SPRAY DRIED/PRE-REACTED CORDIERITE | BM1 (50 μm) | | | | | | | | | | |
| | BM1 (48 μm) | | | 85 | | | | | | | |
| | BM1 (45 μm) | | | | | | | | | | |
| | SM1 (18 μm) | | | | | | | | | 42.5 | |
| BEADS (median bead size) | SM1 (30 μm) | | | | | | 85 | 85 | 85 | 42.5 | |
| | SM1 (35 μm) | | | | 85 | 85 | | | | | |
| | SM2 (45 μm) | 85 | 85 | | | | | | | | 85 |
| SHEAR BINDER AGGLOMERATE | AM1 | 15 | 15 | 15 | 15 | 15 | 15 | 15 | 15 | 15 | 15 |
| PORE FORMERS (weight percent super addition) | | | | | | | | | | | |
| Rice Starch | | | | | 15 | | | | | | |
| Corn Starch | | | 20 | | | | | | | | |
| Crosslinked Pea starch | | 20 | | 20 | 20 | 20 | 20 | 20 | 25 | 25 | 25 |
| Graphite | | 9 | 9* | 9 | 9 | 9 | 9 | 9 | 9 | 9 | 9 |
| *Fine Graphite | | | | | | | | | | | |
| ORGANIC BINDERS (weight percent super addition) | | | | | | | | | | | |
| Hydroxypropyl Methylcellulose F240 | | 3 | 3 | 3 | 9 | 9 | 9 | 9 | 9 | 9 | 9 |
| Hydroxypropyl Methylcellulose TYA | | 6 | 6 | 6 | | | | | | | |
| LIQUID ADDITIONS (weight percent super addition) | | | | | | | | | | | |
| Tall Oil | | 0.75 | 0.75 | 0.75 | | | 1 | 1 | 2 | 2 | 2 |
| Oleic acid | | | | | 1 | 1 | | | | | |

TABLE 7B-continued

| | Batch Example Number: | | | | | | | | | |
|---|---|---|---|---|---|---|---|---|---|---|
| | 24 | 25 | 26 | 27 | 28 | 29 | 30 | 31 | 32 | 33 |
| Liga | | | | | | 1 | | | | |
| Water Call | 45 | 45 | 43 | 37 | 35 | 40 | 48 | 44 | 44 | 44 |

Figure 5A:
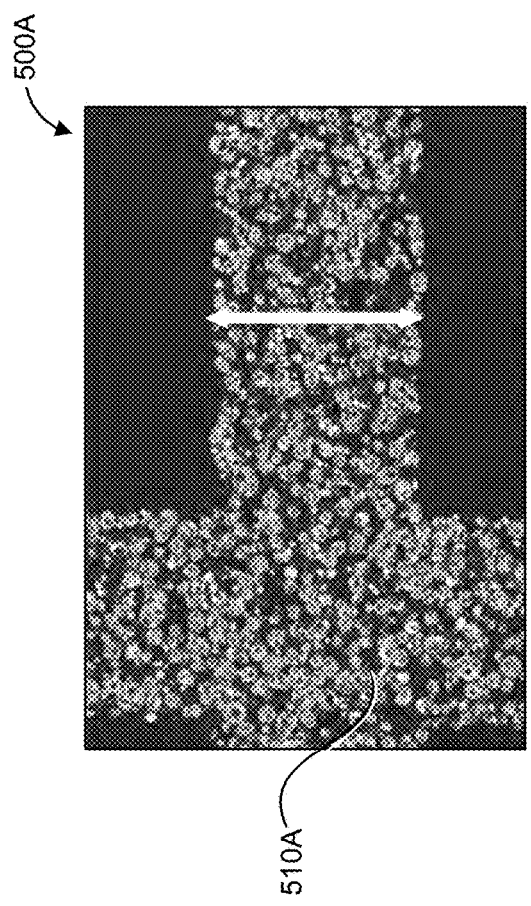
FIG. 5A is an SEM image of a green ceramic article according to some embodiments.
Figure 5B:
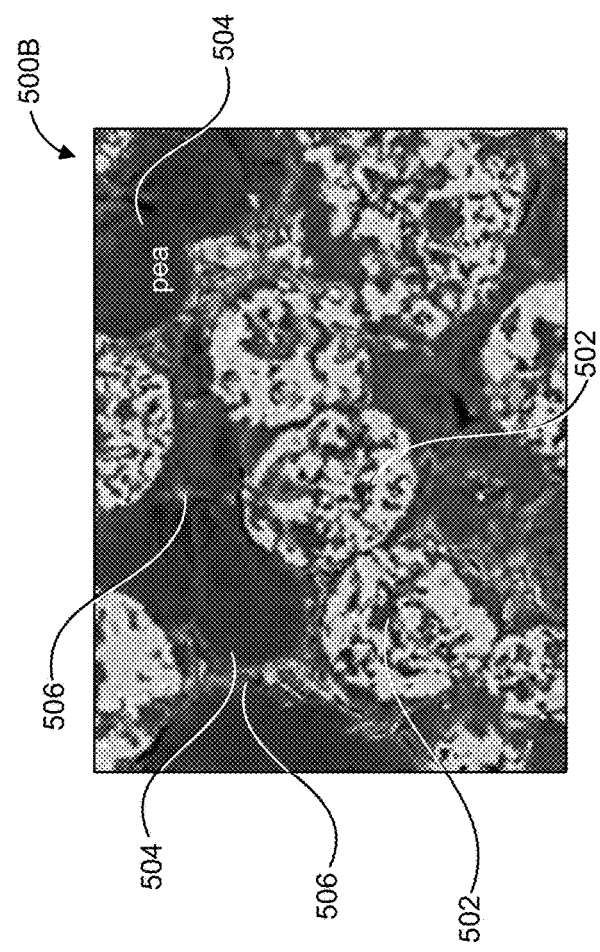
FIG. 5B is a higher magnification SEM image of the green ceramic article of FIG. 5A.
Figure 5C:
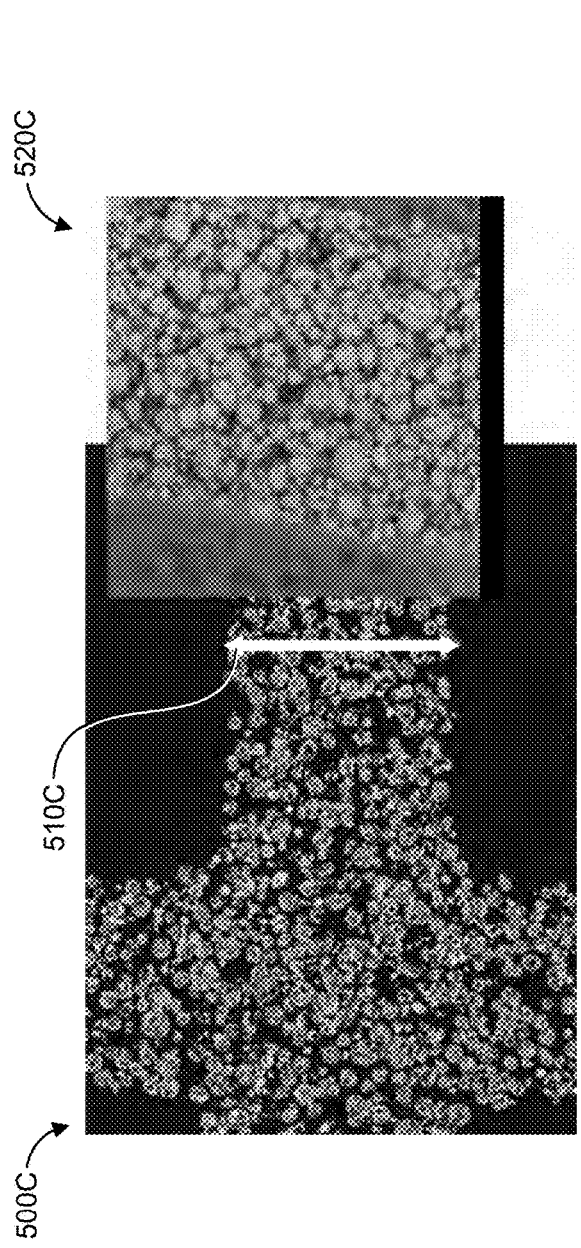
FIG. 5C is an SEM image of polished cross section and on-wall view of a wall of a ceramic article resulting from firing the green porous ceramic article of FIG. 5A.
Figure 5D:
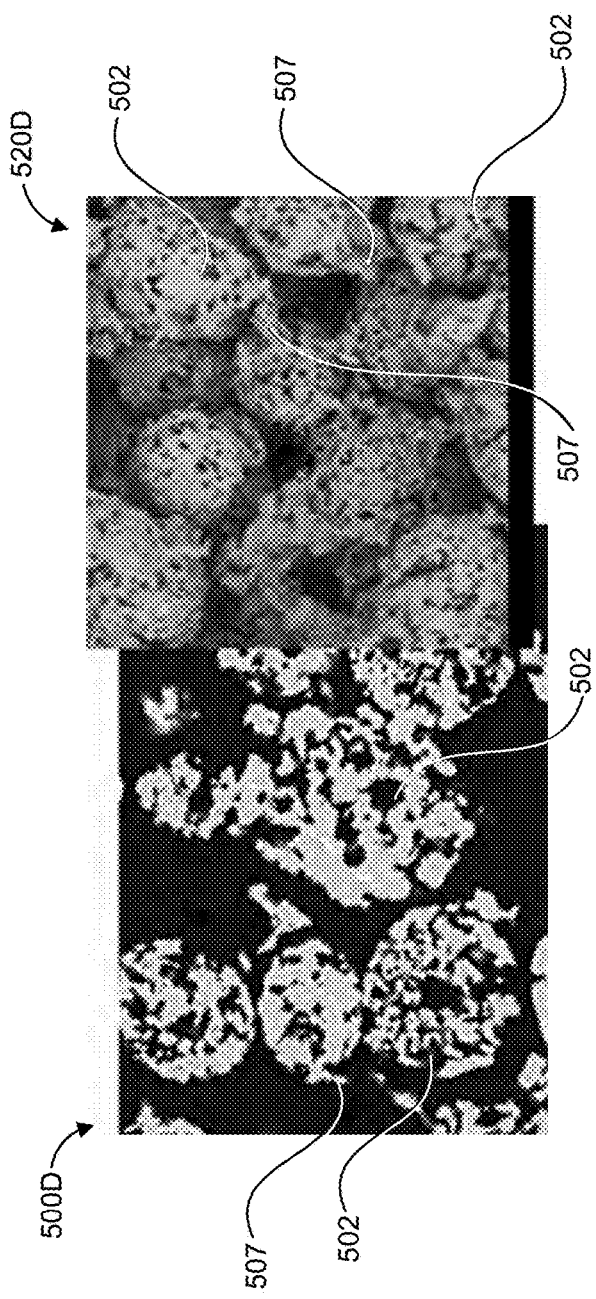
FIG. 5D is an SEM image of a ceramic article resulting from firing the green porous ceramic article of FIG. 5A.
Figures 6A, 6B:
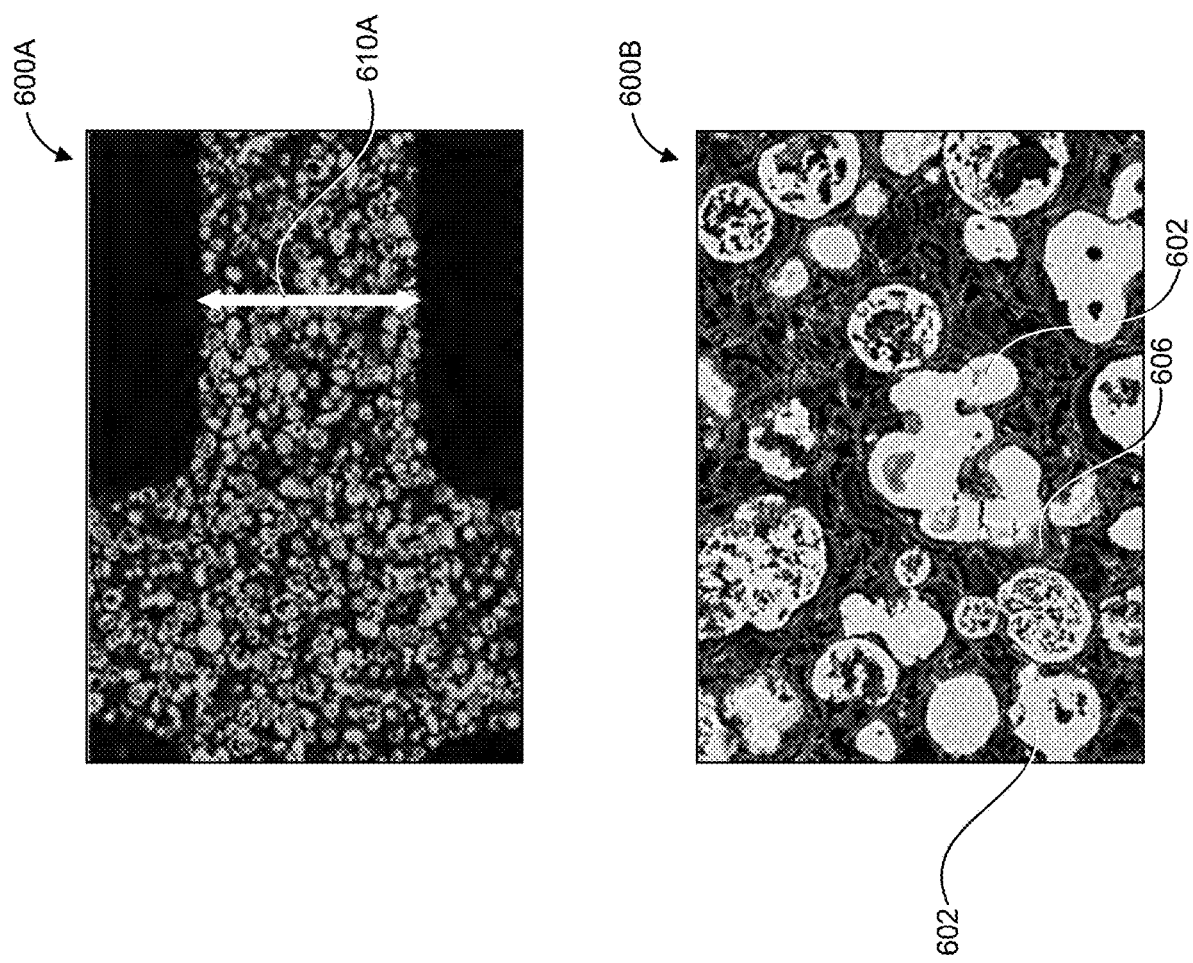
FIG. 6A is an SEM image of an extruded green ceramic article.
FIG. 6B is a higher magnification SEM image of the green ceramic article's microstructure of FIG. 6A.
Figure 6C:
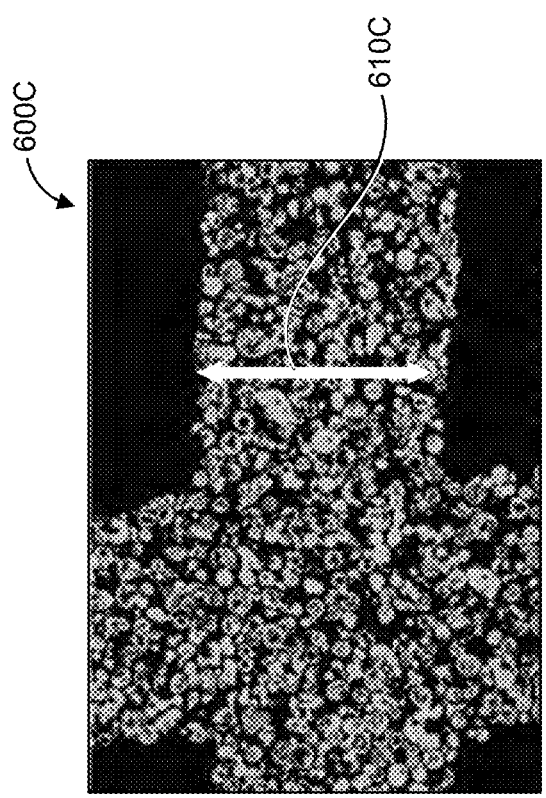
FIG. 6C is an SEM image of a wall of a ceramic article resulting from firing the green porous ceramic article of FIG. 6A.
Figure 6D:
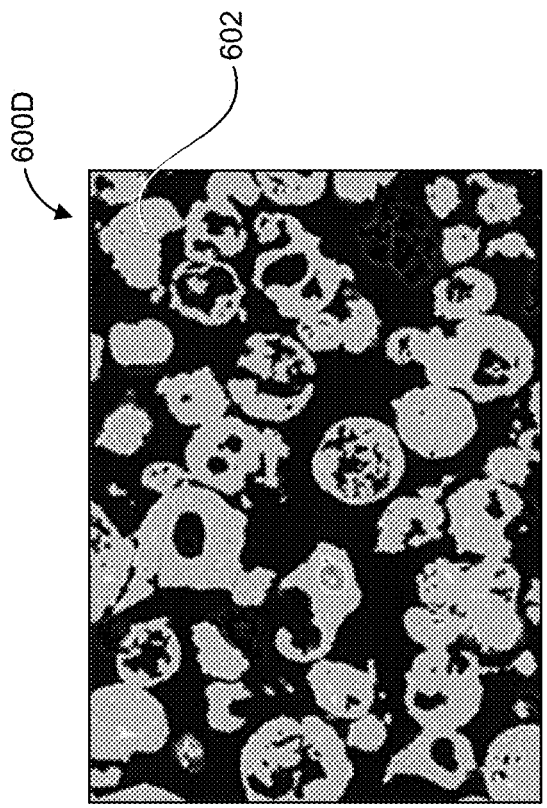
FIG. 6D is an SEM image of a ceramic article resulting from firing the green porous ceramic article of FIG. 6A.
Figure 7B:
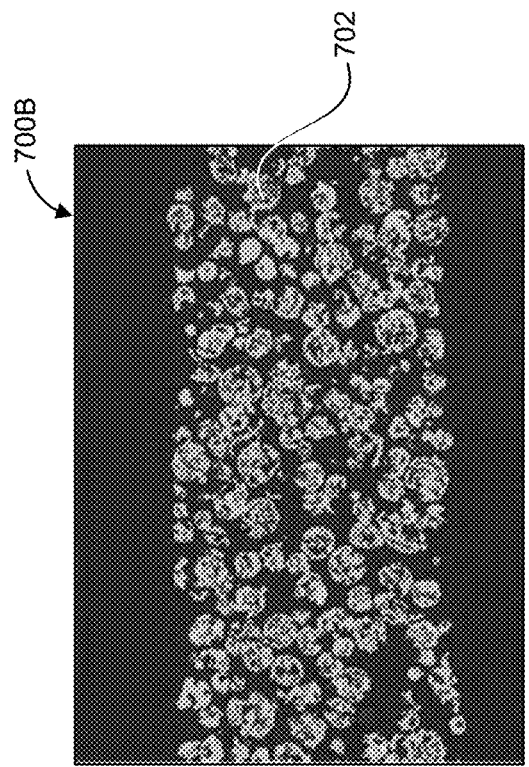
FIGS. 7A-7D are SEM images of a fired porous ceramic honeycomb body.
Figure 7A:
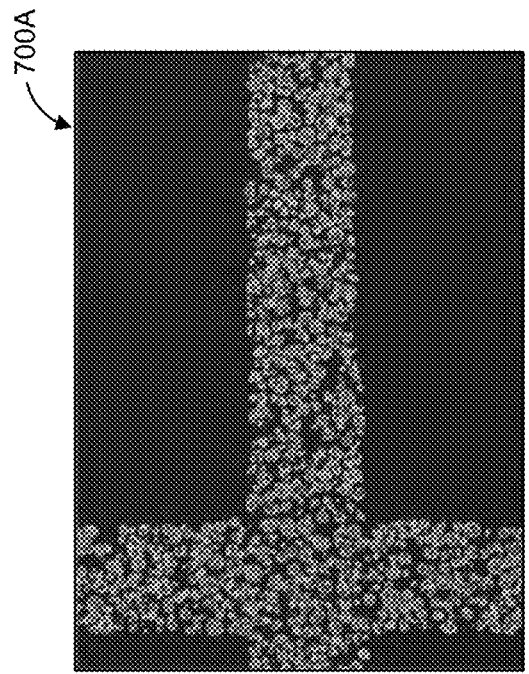
Figure 7D:
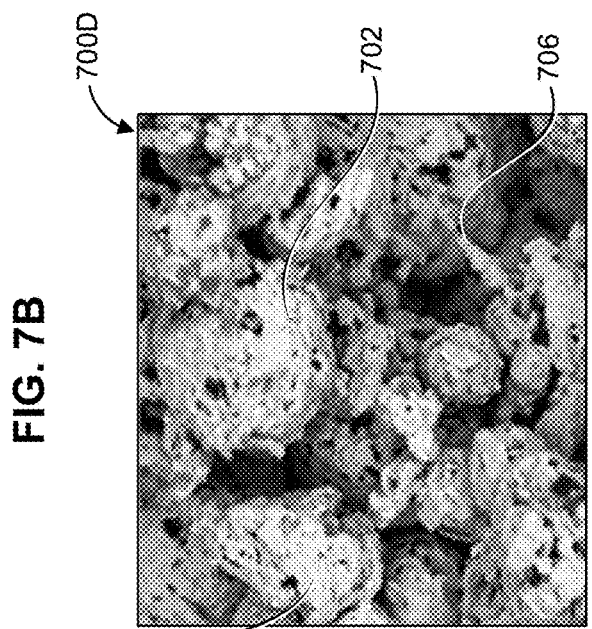
Figure 7C:
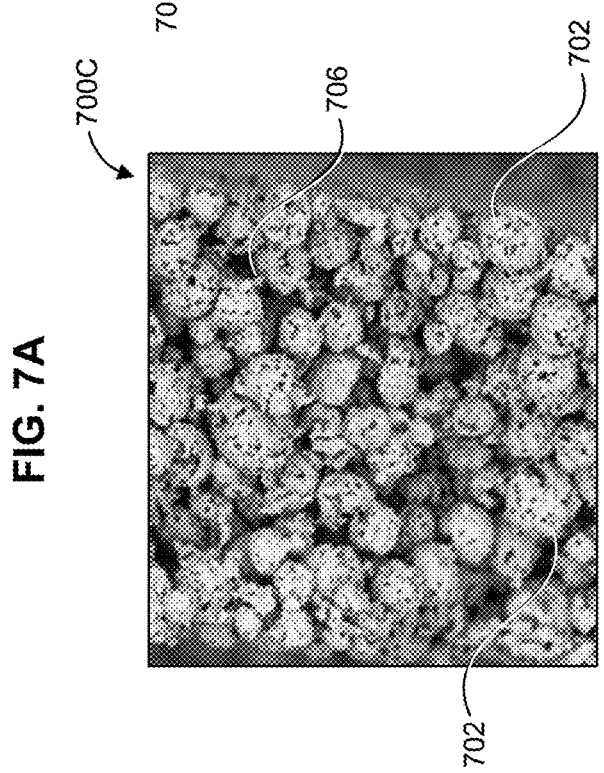

FIGS. 5A-5D show SEM images of an extruded honeycomb article, made from Example 14, at various magnifications, before and after firing. These images demonstrate the effect of the shear binder agglomerates in Example 14. For example, images 500A and 500B are SEM images of a cross-section of a green extruded honeycomb article at different magnifications, and images 500C and 500D are SEM images of a cross-section of the same honeycomb article shown in images 500A and 500B after firing at different magnifications. As shown in image 500A, the inorganic batch beads were distributed regularly, and as shown in image 500B, the shear binder agglomerates 506 were effectively smeared in between adjacent ceramic beads 502 and pore former particles 504, forming ribbons 507. Accordingly, as shown in FIG. 5C, after firing, the wall thickness 510C did not experience shrinkage when compared to the green wall thickness 510A shown in FIG. 5A. And furthermore, as shown in zoomed-in region 520C, the distribution of the ceramic beads remained the same as before firing. The wall thickness was maintained due to the structural support of the shear binder ribbons 507 during firing. During firing, chemical reactions towards formation of cordierite occurred within the inorganic particles of the ribbons (as described with respect to inorganic filler particles 107 in ribbons 106C above), resulting in formation of the ribbons 507 as porous interlinks of cordierite that spanned across interbead gaps and interconnected the inorganic batch beads 502. These interlinks can be seen more clearly in the zoomed in view 520D of SEM image 500D.

FIGS. 6A-6D show SEM images of an extruded honeycomb article, made from Example 16, at various magnifications, before and after firing. While Example 14 in FIGS. 5A-5D contained relatively large pore formers (pea starch and coarse graphite), Example 16 used relatively fine pore formers, (corn starch and finer graphite), so that the shear binder agglomerate had to cover a much larger interparticle area in Example 16. FIGS. 6A-6D illustrate the efficiency of the shear binder agglomerate for small pore former particle size. Similar to FIGS. 5A-5D with respect to Example 14, the images of FIGS. 6A-6D demonstrate the effect of the shear binder agglomerates within Example 16. For example, images 600A and 600B are SEM images of a cross-section of the green extruded honeycomb article at different magnifications, and images 600C and 600D are SEM images of a cross-section of the same extruded honeycomb article shown in images 600A and 600B, at different magnifications after firing. As shown in image 600A, the ceramic beads were distributed regularly, and as shown in image 600B, the shear binder agglomerates 606 were smeared in between inorganic batch beads 602 and pore former particles. Due to the larger particle surface area of the batch of Example 16 comprising fine pore formers, the amount of smeared shear binder ribbons is less than that shown in FIGS. 5A and 5B.

As shown in image 600C, for example, the fired wall thickness 610C of the honeycomb article did not shrink, when compared to green wall thickness 610A. However, as shown in image 600D, the ribbons formed by the shear binder agglomerates 606 were thinner and more irregular than those shown in FIG. 5D. This is because the corn starch and graphite particles used as pore former in Example 16 were smaller than the pea starch and graphite pore forming particles used in Example 14. Accordingly, the density of the fired honeycomb article made using composition 16 is greater than the density of the honeycomb article produced by Example 14, e.g., the ribbons in FIGS. 6A-6D were not strong enough and/or did not comprise enough material to hold the ceramic beads as far apart from each other as in FIGS. 5A-5D. These results suggest that it can be beneficial to scale the amount of shear binder agglomerates added to the compositions to be the approximately equal to the sum of ceramic beads and pore former surface areas. These results also suggest that the amount of shear binder agglomerates can be beneficially adjusted to accommodate for the sizes of the ceramic beads and pore former particles (e.g., more shear binder agglomerates utilized for relatively smaller ceramic beads and pore former particles.

FIGS. 7A-7D show SEM images of a cross-section of a fired extruded honeycomb article, made from Example 31, at various magnifications. As shown in images 700A and 700B, the distribution of the ceramic beads 702 is regular. Furthermore, the amount of shear binder agglomerates within the composition was sufficient to stabilize the extruded green honeycomb body during firing, and little to no wall shrinkage occurred. And, as shown in images 700C and 700D, ribbons 706 formed from smeared shear binder agglomerates can be seen between inorganic batch beads 702. The final fired porosity of the honeycomb article produced by Example 31 was greater than 60%.

Figure 10B:
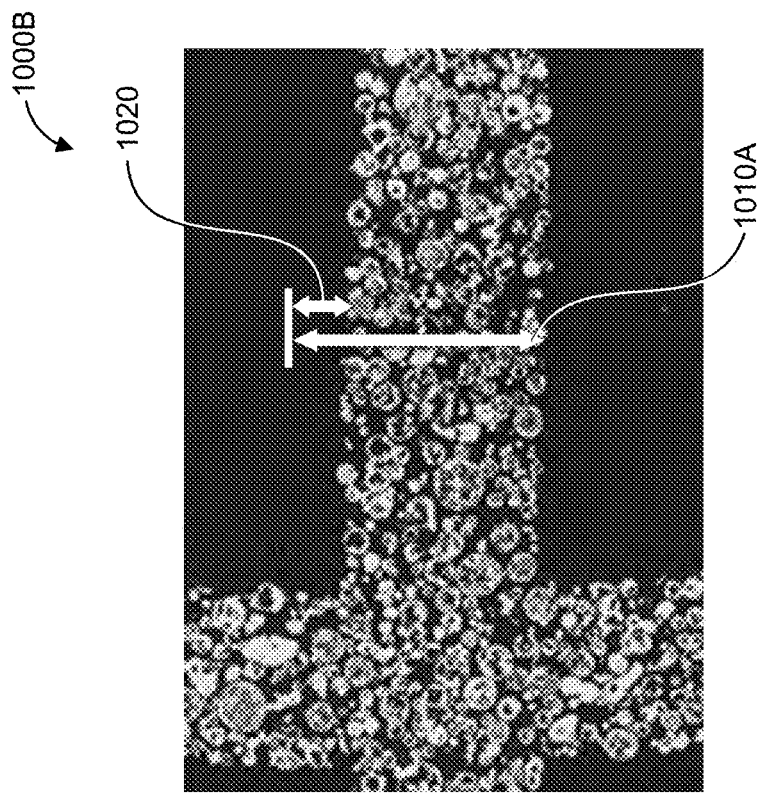
FIG. 10B is an SEM image of the wall of a ceramic article resulting from firing the green porous ceramic article FIG. 10A.
Figure 10A:
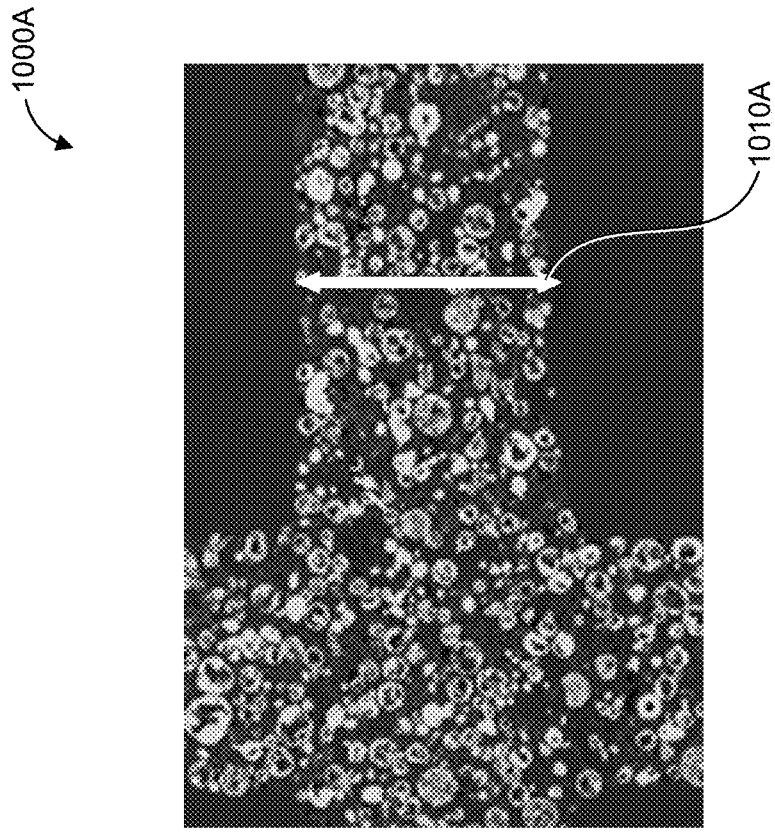
FIG. 10A is an SEM image of a wall of a green porous ceramic article.

FIGS. 10A and 10B show SEM cross-sectional images of a matrix wall of an extruded honeycomb article made from Example 19, before and after firing, respectively. The honeycomb article fired satisfactorily and the macroscopic dimensions were preserved. However, the extruded green wall thickness 1010A in the green honeycomb 1000A was not preserved during firing. As shown in image 1000B, the ceramic beads are more tightly packed, and the wall shrunk in thickness, as demonstrated by marker 1020. Without wishing to be bound to theory, this shrinkage is believed to have occurred because the amount of shear binder agglomerates in Example 19 was insufficient to stabilize a particle packing with 90 wt % ceramic beads having a relatively large size (48 μm median bead size), 18 wt % super addition pea starch particles, and 9 wt % super addition graphite particles. In view of the relatively large size of the ceramic beads used in this example, the amount of shear binder agglomerate (i.e., 10 wt %) is believed to have been too low to stabilize the extruded bead packing during firing. Additionally, although the honeycomb article made using Example 19 remained intact after firing, insufficient amounts of shear binder agglomerates, while still leading to successful firing, may result in a significantly large associated shrinkage.

Table 8, below, summarizes the batch mixture used to create one inch extrusions of pre-reacted CMAT beads with CMAT-type shear binder agglomerates.

TABLE 8

| Honeycomb Batch Example Number: | | 34 | 35 |
|---|---|---|---|
| SPRAY DRIED/PRE-REACTED CMAT BEADS | SM4 (35 μm) (1350° C./6 H) | 94 | |
| | SM3 (35 μm) (1350° C./6 H) | | 97 |
| SHEAR BINDER AGGLOM. | AM6 green spraydried CMAT (18 μm median particle size) | 6 | 3 |
| PORE FORMER | Crosslinked Pea Starch | 18 | 18 |
| | Graphite | 9 | 9 |
| | Hydroxypropyl Methylcellulose TYA 115 | 3 | 3 |
| | Tall Oil | 0.75 | 0.75 |
| GREEN EXTRUDED HONEYCOMB QUALITY | | good | good |
| FIRED HONEYCOMB QUALITY | Firing 1340° C./ 4 h | good | powderized |

Honeycomb articles made from Example 34, having 6% CMAT-type shear binder agglomerates showed excellent fired quality, while parts made with 3% of the same shear binder agglomerates powderized during firing.

Table 9 summarizes the batch compositions used to create two inch extrusions of pre-reacted CMAT with both CMAT-type and cordierite-type shear binder agglomerates.

TABLE 9

| | | Batch Composition Number: | | | | | | | |
|---|---|---|---|---|---|---|---|---|---|
| | | 36 | 37 | 38 | 39 | 40 | 41 | 42 | 43 |
| Material | | WEIGHT PERCENT | | | | | | | |
| PREREACTED BEADS | SM4 (35 μm) (1325° C./8 h) (60% AT) | 92 | 90 | 92 | | | | | |
| | SM6 (35 μm) (1350° C./6 h) (75% AT) | | | | 92 | 90 | 92 | | |
| | SM7 (35 μm) (1325° C./6 h) (65% AT) | | | | | | | 92 | 92 |
| INORGANIC BINDER | AM6 CMAT green spray dried cyclone | | 10 | | | 10 | | | |
| | AM5 cordierite green spray dried cyclone (no Na) | | | 8 | | | 8 | | 8 |
| | Binder S4 cordierite green spray dried cyclone (no Na) | | | | | | | | |
| | Alumina | 2.5 | | | 2.5 | | | 2.5 | |
| | Talc | 3.25 | | | 3.25 | | | 3.25 | |
| | Silica (Ludox HS40) | 5 | | | 5 | | | 5 | |
| | | Weight Percent Super Addition | | | | | | | |
| PORE FORMER | Crosslinked Pea starch | 22 | 22 | 22 | 22 | 22 | 22 | 22 | 22 |
| | Graphite | 9 | 9 | 9 | 9 | 9 | 9 | 9 | 9 |
| SOLID BINDER | Hydroxypropyl Methylcellulose F240 LF | 3 | 3 | 3 | 3 | 3 | 3 | 3 | 3 |
| | Hydroxypropyl Methylcellulose TYA115 | 6 | 6 | 6 | 6 | 6 | 6 | 6 | 6 |
| OTHER LIQUID ADDITIONS | Tall Oil | 1 | 1 | 1 | 1 | 1 | 1 | 1 | 1 |
| | WATER CALL | 30 | 30 | 30 | 30 | 30 | 30 | 30 | 30 |

In the compositions listed in Tables 5-9, above, pre-reacted beads of cordierite and CMAT having mean bead sizes of 30 μm-50 μm (micrometers) were used as the ceramic beads. These bead sizes are relatively large with respect to the typical slot widths of honeycomb extrusion dies. Additionally, due to the spray-dry and sieve process utilized to produce the ceramic beads, the breadth of the bead size distribution can be kept relatively narrow (e.g., less than 1.5 as described above). Both of these factors would typically (e.g., under the scenario described with respect to FIGS. 2A-2C) cause difficulty in producing a successfully extruded and fired article. Accordingly, to demonstrate the efficacy of the green spray dried shear binder agglomerates, large bead sizes were used, and each batch had a narrow particle distribution, i.e., a particle size distribution breadth less than 1.5.

FIGS. 9A-9D show SEM images, at different magnifications, of wall surface views of various fired cordierite pre-reacted batch beads of various sizes with different interconnecting branch lengths caused by the addition of various shear binder agglomerates. In each of images 920A, 920B, 920C, and 920D, small interconnecting branches formed by the shear binder ribbons 906A, 906B, 906C, and 906D, respectively, can be seen interconnecting ceramic beads 902A, 902B, 902C, and 902D, respectively. These branches provided stability during firing and contributed to the final fired strengths of each of the honeycomb articles. Interconnecting branches vary in length with the batch nature and bead size. Increasing branch length is observed with pore former from FIG. 9A (90 wt. % beads from mixture BM1, 10 wt. % agglomerates according to mixture AM2, 8 wt. % super addition pea starch, and 4 wt. % super addition graphite), to FIG. 9B (85 wt. %-40 μm median bead size—beads according to mixture BM2, 15 wt. % agglomerates according to mixture AM2, and no pore former), to FIG. 9C (85 wt. %-22 µm median bead size—beads according to mixture BM2, 15 wt. % agglomerate according to mixture AM2, 8 wt. % super addition pea starch, and 4 wt. % super addition graphite), to FIG. 9D (85 wt. %-30 µm median bead size—beads according to mixture BM2 with 15 wt. % agglomerates according to mixture AM1, 20 wt. % super addition pea starch, and 9 wt. % super addition graphite). The longest bridges are observed in FIG. 9D, having approximately the same length as the diameters of the beads.

Figure 13B:
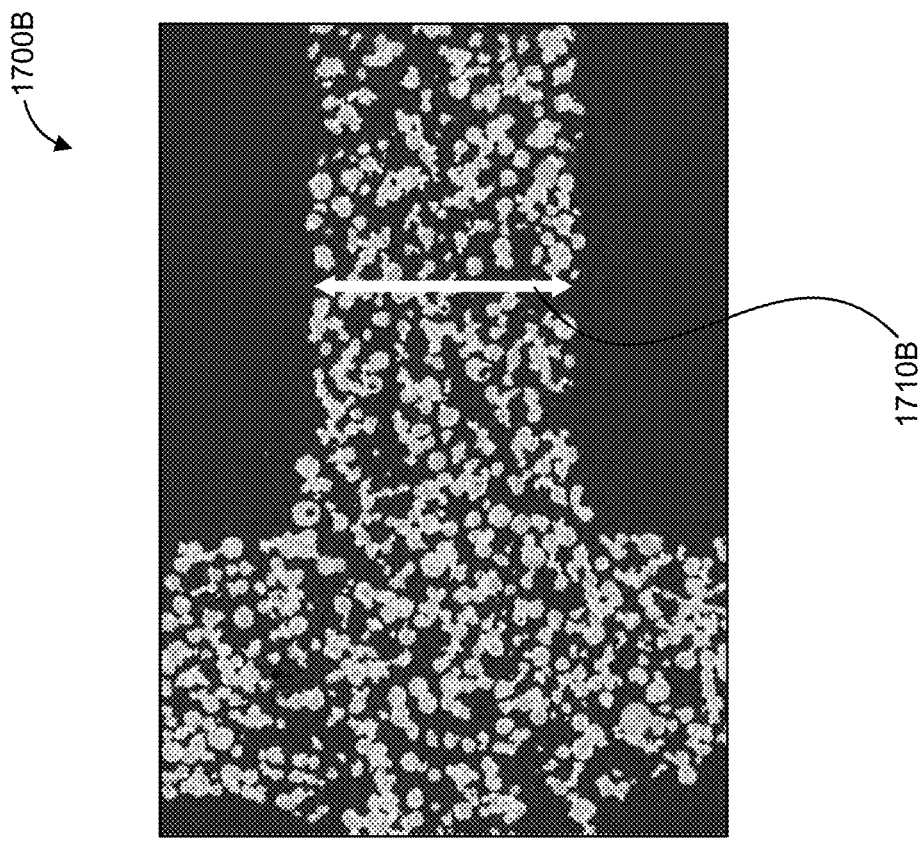
FIG. 13B is an SEM image of a ceramic article resulting from firing the green porous ceramic article of FIG. 13A.
Figure 13A:
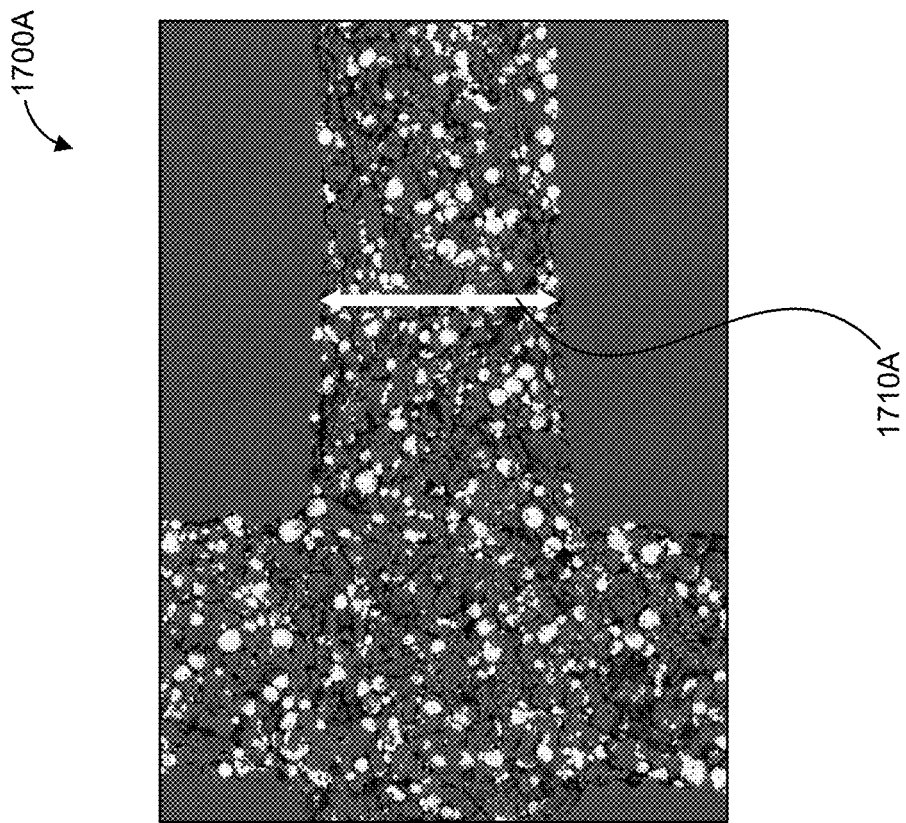
FIG. 13A is an SEM image of a green porous ceramic article.
Figure 14D:
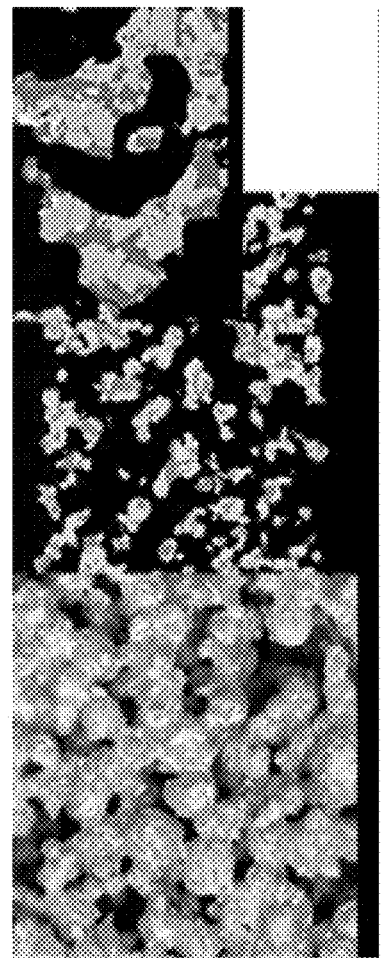
FIGS. 14A-14D show SEM images of a comparative extruded honeycomb article, made from an extrusion batch containing pre-reacted CMAT beads, at various magnifications, before and after firing.
Figure 14B:
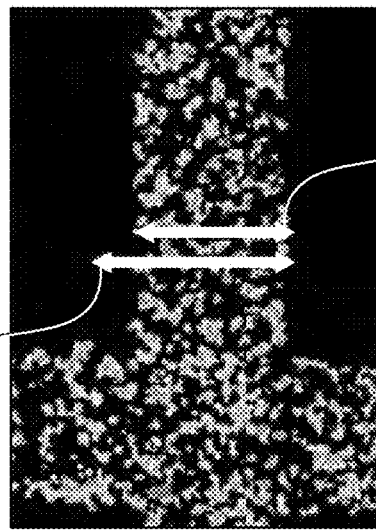
Figure 14A:
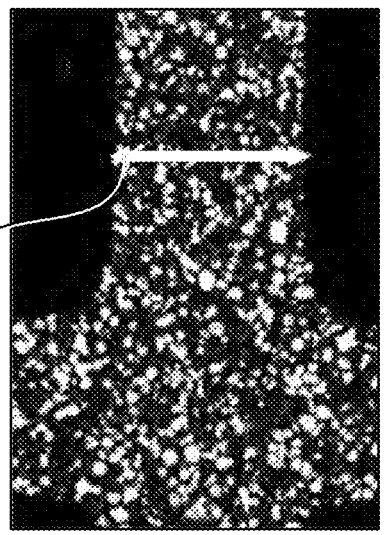
Figure 14C:
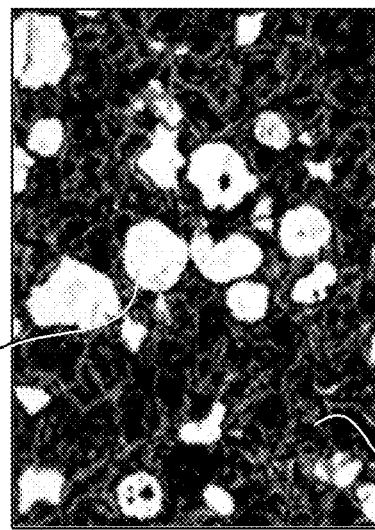

FIGS. 13A and 13B show SEM images of successfully fired two-inch CMAT parts with green shear binder agglomerates of cordierite precursors as in Example 29. Image 1700A is an SEM image of a cross-section of a wall of the green extruded honeycomb article. Image 1700B is an SEM image of the same cross-section as in image 1700A after firing. As shown in image 1700B, the distribution of pre-reacted CMAT beads within the wall is homogeneous and the green wall thickness 1710A in image 1700A is preserved after firing, see wall thickness 1710B in image 1700B.

FIGS. 14A-14D show SEM images of a comparative extruded honeycomb article, made from an extrusion batch containing pre-reacted CMAT beads, at various magnifications, before and after firing. The batch mixture of FIGS. 18A-18D included pre-reacted dense CMAT beads, corn starch, and graphite, with a fine powder mixture as inorganic binder (as opposed to shear binder agglomerates). Image 1800A shows a cross-section of the wall of the green extruded honeycomb article, while image 1800B shows the same cross-section after firing. As shown by marker 1820, significant wall shrinkage occurred, as compared to green wall thickness 1810A, because the green CMAT beads did not have sufficient structural support and stability during firing.

Images 1800C and 1800D are higher magnification views of the green and fired cross-sections shown in images 1800A and 1800B. As shown in image 1800C, the pre-reacted CMAT particles 1802 and corn starch particles 1804 can be distinguished, but the decoration (white contrast) of the particle surfaces with inorganic binder in the green body is very thin and not continuous. And, the views shown in image 1800D suggest that, during firing, the green CMAT batch beads collapsed until they were each in contact with adjacent beads, which resulted in a dense, interconnected, sintered bead packing. As discussed above, this collapse can be avoided by use of the shear binder agglomerates disclosed herein. The bead packing in the wall was only stabilized once the fired CMAT batch beads sintered together at contact points into a stable, but lower porosity structure. This is because the level of binder added to the composition was insufficient to stabilize the batch packing. Therefore, even though no powderization occurred, the final fired honeycomb article was not ideal, due to the low level of porosity that was achieved.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A porous honeycomb body, comprising:
  a matrix of cells, the matrix of cells comprising a porous ceramic material comprising:
    a plurality of ceramic beads; and
    a plurality of inorganic ribbons spanning interbead gaps between adjacent ceramic beads, and connecting adjacent ceramic beads together, wherein at least 50% of the ceramic beads are connected to at least one of the ribbons.

2. The honeycomb body of claim 1, wherein the ribbons bridge across interbead gaps to interconnect ceramic beads that are not in direct contact with each other.

3. The honeycomb body of claim 1, wherein less than 10% of the ceramic beads are in direct contact with adjacent ceramic beads.

4. The honeycomb body of claim 1, wherein at least 90% of the ceramic beads are connected to at least one of the ribbons.

5. The honeycomb body of claim 1, wherein the ceramic beads comprise a median bead size in a range of 20 µm to 65 µm.

6. The honeycomb body of claim 1, wherein the ribbons comprise a thickness in a range of 3% to 10% of a median bead size of the ceramic beads and a length in a range of 30% to 100% of the median bead size of the ceramic beads.

7. The honeycomb body of claim 1, wherein the ribbons comprise at least one of: cordierite, a cordierite-mullite-aluminum-titanate composite, an aluminum-titanate composite, alumina, talc, or silica.

8. A porous honeycomb body, comprising:
a matrix of cells, the matrix of cells comprising a porous ceramic material comprising:
 a plurality of ceramic beads; and
 a plurality of inorganic ribbons spanning interbead gaps between adjacent ceramic beads, and connecting adjacent ceramic beads together,
wherein less than 50% of the ceramic beads are in direct contact with adjacent ceramic beads.

9. The honeycomb body of claim 8, wherein less than 10% of the ceramic beads are in direct contact with adjacent ceramic beads.

10. A method for manufacturing an extruded ceramic body, the method comprising:
mixing a plurality of inorganic filler particles and a polymeric binder, thereby forming a shear binder mixture;
forming a plurality of green shear binder agglomerates from the shear binder mixture;
mixing together a plurality of ceramic beads and the plurality of green shear binder agglomerates, thereby forming an extrusion paste;
extruding the extrusion paste to form a green body, wherein during at least one of the mixing or the extruding the shear binder agglomerates are deformed under an applied shear stress to span interbead gaps between adjacent ceramic beads;
drying the green body; and
firing the green body to form a fired ceramic body comprising a network of the ceramic beads interconnected by ribbons formed from the inorganic filler particles of the deformed green shear binder agglomerates,
wherein one or more of (i) less than 50% of the ceramic beads are in direct contact with adjacent ceramic beads and (ii) at least 50% of the ceramic beads are connected to at least one of the ribbons, and wherein the green body comprises a honeycomb geometry.

11. The method of claim 10, wherein forming the plurality of green shear binder agglomerates comprises spraydrying the shear binder mixture.

* * * * *